United States Patent
Walker et al.

(10) Patent No.: US 6,240,396 B1
(45) Date of Patent: *May 29, 2001

(54) CONDITIONAL PURCHASE OFFER MANAGEMENT SYSTEM FOR EVENT TICKETS

(75) Inventors: Jay S. Walker, Ridgefield; Robert R. Lech; Andrew S. Van Luchene, both of Norwalk; Thomas M. Sparico, Riverside; James A. Jorasch, Stamford, all of CT (US); Bruce Schneier, Minneapolis, MN (US)

(73) Assignee: priceline.com Incorporated, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/923,530

(22) Filed: Sep. 4, 1997

Related U.S. Application Data

(63) Continuation-in-part of application No. 08/889,319, filed on Jul. 8, 1997, which is a continuation-in-part of application No. 08/707,660, filed on Sep. 4, 1996, now Pat. No. 5,794,207.

(51) Int. Cl.[7] .................................................... G06F 17/60
(52) U.S. Cl. .................................. 705/26; 705/5; 705/13; 705/27; 705/37
(58) Field of Search .............................. 705/26, 1, 5, 13, 705/15, 27, 37, 35; 295/226, 228, 236, 237, 239; 340/825.3

(56) References Cited

U.S. PATENT DOCUMENTS

| | | |
|---|---|---|
| 3,573,747 | 4/1971 | Adams et al. . |
| 3,581,072 | 5/1971 | Nymeyer . |
| 3,757,685 | 9/1973 | Woodie et al. ........................ 235/101 |
| 3,829,133 | 8/1974 | Smagala-Romanoff ............... 283/70 |
| 3,937,894 | 2/1976 | Grzybowski et al. ................. 379/26 |

(List continued on next page.)

FOREIGN PATENT DOCUMENTS

| | | |
|---|---|---|
| 512 702 A2 | 11/1992 | (EP) . |
| WO95/16971 | 6/1995 | (WO) . |
| WO96/13013 | 5/1996 | (WO) . |

(List continued on next page.)

OTHER PUBLICATIONS

About IAO, selected pages downloaded from www.iaoauction.com on Sep. 8, 1997 and Sep. 18, 1997.

(List continued on next page.)

*Primary Examiner*—Emanuel Todd Voeltz
*Assistant Examiner*—John W. Hayes
(74) *Attorney, Agent, or Firm*—Morgan & Finnegan LLP

(57) ABSTRACT

A system for managing conditional purchase offers is disclosed where an individual searching for a ticket to a particular event may provide a guaranteed purchase offer to a plurality of potential sellers. Various methods and systems for completing such a transaction are also disclosed. An exemplary method includes: making available a guaranteed purchase offer to a plurality of potential sellers; potential sellers examining offers corresponding to a ticket they possess; and a potential seller providing an acceptance to the guaranteed purchase offer. The disclosure describes a method of payment whereby both the buyer and seller must provide credit card pre-authorization to ensure payment and delivery of the ticket. Also, one embodiment discloses a delivery of the ticket that includes the participation of the venue hosting the event. In this embodiment, the traditional practice of exchanging tickets for cash is replaced with an electronic serial number system. According to this system, the venue may be notified to cancel the serial number originally assigned to the ticket held by the seller, and re-assign a new serial number directly to the buyer. The buyer may then exchange this number for a ticket at the venue box office.

12 Claims, 18 Drawing Sheets

U.S. PATENT DOCUMENTS

| | | | |
|---|---|---|---|
| 4,247,759 | 1/1981 | Yuris et al. . | |
| 4,449,186 | 5/1984 | Kelly et al. . | |
| 4,522,429 | 6/1985 | Gardner et al. | 283/91 |
| 4,553,222 | 11/1985 | Kurland et al. . | |
| 4,677,552 | 6/1987 | Sibley, Jr. . | |
| 4,721,954 | 1/1988 | Mauch | 340/825.31 |
| 4,751,728 | 6/1988 | Treat . | |
| 4,789,928 | 12/1988 | Fujisaki . | |
| 4,799,156 | 1/1989 | Shavit et al. . | |
| 4,867,481 | 9/1989 | Gundjian | 283/91 |
| 4,903,201 | 2/1990 | Wagner . | |
| 4,931,932 | 6/1990 | Dalnekoff et al. . | |
| 4,972,182 | 11/1990 | Novik et al. | 340/825.32 |
| 5,018,286 | 5/1991 | Zahner | 40/665 |
| 5,021,953 | 6/1991 | Webber et al. . | |
| 5,053,612 | 10/1991 | Pielemeier et al. | 235/462.42 |
| 5,136,501 | 8/1992 | Silverman et al. . | |
| 5,168,446 | 12/1992 | Wiseman . | |
| 5,171,040 | 12/1992 | Orndorff | 283/93 |
| 5,191,523 | 3/1993 | Whitesage . | |
| 5,191,613 | 3/1993 | Graziano et al. . | |
| 5,204,663 | 4/1993 | Lee | 340/825.34 |
| 5,224,034 | 6/1993 | Katz et al. . | |
| 5,243,515 | 9/1993 | Lee . | |
| 5,253,165 | 10/1993 | Leiseca et al. . | |
| 5,262,941 | 11/1993 | Saladin et al. . | |
| 5,283,731 | 2/1994 | Lalonde et al. . | |
| 5,290,068 | 3/1994 | Gundjian | 283/67 |
| 5,291,243 | 3/1994 | Heckman et al. | 380/55 |
| 5,297,031 | 3/1994 | Gutterman et al. . | |
| 5,317,135 | 5/1994 | Finocchio | 235/375 |
| 5,329,589 | 7/1994 | Fraser et al. . | |
| 5,331,546 * | 7/1994 | Webber et al. | 705/6 |
| 5,338,066 | 8/1994 | Gundjian | 283/67 |
| 5,338,067 | 8/1994 | Gundjian | 283/67 |
| 5,354,723 | 10/1994 | Gundjian | 283/67 |
| 5,361,199 | 11/1994 | Shoquist et al. . | |
| 5,375,055 | 12/1994 | M. Togher, et al. . | |
| 5,404,291 | 4/1995 | Kerr et al. . | |
| 5,420,914 | 5/1995 | Blumhardt . | |
| 5,421,869 | 6/1995 | Gundjian et al. | 427/145 |
| 5,424,266 | 6/1995 | Gundjian | 503/201 |
| 5,426,281 | 6/1995 | Abecassis . | |
| 5,444,630 | 8/1995 | Dlugos . | |
| 5,451,052 | 9/1995 | Behm et al. | 273/139 |
| 5,467,269 | 11/1995 | Flaten . | |
| 5,476,830 | 12/1995 | Gundjian | 427/152 |
| 5,491,752 | 2/1996 | Kaufman et al. | 310/71 |
| 5,499,816 | 3/1996 | Levy | 273/139 |
| 5,500,793 | 3/1996 | Deming, Jr. et al. . | |
| 5,516,362 | 5/1996 | Gundjian et al. | 427/145 |
| 5,517,555 | 5/1996 | Amadon et al. . | |
| 5,519,769 | 5/1996 | Weinberger et al. . | |
| 5,532,200 | 7/1996 | Gundjian | 503/201 |
| 5,553,131 | 9/1996 | Minervino, Jr. et al. . | |
| 5,557,517 | 9/1996 | Daughterty, III . | |
| 5,557,518 | 9/1996 | Rosen . | |
| 5,570,283 | 10/1996 | Shoolery et al. . | |
| 5,592,375 | 1/1997 | Salmon et al. . | |
| 5,595,590 | 1/1997 | Belding et al. | 428/29 |
| 5,606,602 | 2/1997 | Johnson et al. . | |
| 5,606,609 | 2/1997 | Houser et al. | 713/179 |
| 5,611,052 | 3/1997 | Dykstra et al. . | |
| 5,615,269 | 3/1997 | Micali . | |
| 5,620,182 | 4/1997 | Rossides | 705/14 |
| 5,636,874 | 6/1997 | Singer | 283/94 |
| 5,644,721 | 7/1997 | Chung et al. | 705/6 |
| 5,664,115 | 9/1997 | Fraser . | |
| 5,689,652 | 11/1997 | Lupien et al. . | |
| 5,694,551 | 12/1997 | Doyle et al. . | |
| 5,696,965 | 12/1997 | Dedrick . | |
| 5,715,402 | 2/1998 | Popolo . | |
| 5,717,989 | 2/1998 | Tozzoli et al. . | |
| 5,732,400 | 3/1998 | Mandler et al. . | |
| 5,745,882 | 4/1998 | Bixler et al. . | |
| 5,754,654 * | 5/1998 | Hiroya et al. | 380/24 |
| 5,757,917 | 5/1998 | Rose et al. . | |
| 5,758,328 | 5/1998 | Giovannoli . | |
| 5,774,883 | 6/1998 | Andersen et al. . | |
| 5,794,207 | 8/1998 | Walker et al. . | |
| 5,794,219 | 8/1998 | Brown . | |
| 5,797,126 | 8/1998 | Helbling, et al. | 705/5 |
| 5,797,127 | 8/1998 | Walker et al. . | |
| 5,799,285 | 8/1998 | Klingman . | |
| 5,809,478 | 9/1998 | Greco et al. . | |
| 5,826,244 * | 10/1998 | Huberman | 705/37 |
| 5,832,452 | 11/1998 | Schneider et al. . | |
| 5,835,896 | 11/1998 | Fisher et al. . | |
| 5,845,265 | 12/1998 | Woolston . | |
| 5,878,403 | 3/1999 | DeFrancesco et al. . | |
| 6,023,685 * | 2/2000 | Brett et al. | 705/37 |

FOREIGN PATENT DOCUMENTS

| | | | |
|---|---|---|---|
| 96/34356 | 10/1996 | (WO) . | |
| 97/16797 | 5/1997 | (WO) | G06F/17/60 |
| 97/46961 | 12/1997 | (WO) . | |

OTHER PUBLICATIONS

Classifieds2000: The Internet Classifieds, selected pages downloaded from www.classifieds2000.com on Aug. 6, 1997.

CyberBid, Net Fun Ltd. (1996).

Laura Del Rosso, *Marketel Says It Plans to Launch Air Fare 'Auction' in Jun.; Marketel International, Inc.*, Travel Weekly, Apr. 29, 1991, at 1.

Laura Del Rosso, *Ticket–Bidding Firm Closes its Doors; Marketel International, Inc.*, Travel Weekly, Mar. 12, 1992, at 1.

Fran Golden, *AAL'S Riga Doubts Marketel's Appeal to Retailers*; Chris Riga of American Airlines, Travel Weekly, Nov. 13, 1989, at 4.

Robert Kuttner, *Computers May Turn the World Into One Big Commodities Pit*, Business Week, Sep. 11, 1989, at 17.

NASDAQ Consolidated Subscriber Agreement, downloaded from www.pcquote.com/exchanges on Aug. 15, 1997.

NASDAQ: What Is NASDAQ?, selected pages downloaded from http://home.axford.com on Aug. 15, 1997.

Onsale: Auction Supersite, selected pages downloaded from www.onsale.com on Sep. 8, 1997.

Jeff Pelline, *Travelers Bidding on Airline Tickets*; SF Firm Offers Chance for Cut Rate Fares, The San Francisco Chronicle, Aug. 19, 1991, (News) at A4.

J. Kelsey and B. Schneier, Conditional Purchase Orders, 4th ACM Conference on Computer and Communications Security, ACM Press, 117–124 (Apr. 1997).

Michael Schrage, *An Experiment In Economic Theory; Labs Testing Real Markets*, The Record, Nov. 26, 1989, (Business) at B01.

The United Computer Exchange: How It All Works, selected pages downloaded from www.uce.com on Jul. 23, 1997.

TradingFloor: General Trading Information and Terms, downloaded from www.tradingfloor.com on Aug. 14, 1997.

Fishkin, Ken, Foresight Exchange Tutorial: (http://www.ideosphere.com/fx/docs/tutorial.html) Feb. 19, 1999 at p. 1–5.

"Bid.com 1998 Third–Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtual h02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pp. downloded from www.iaoaution.com on Sep. 8, 1997 and Sep. 18, 1997.

Onsale: Auction Supersite, selected pp. downloaded from www.onsale.com on Sep. 8, 1997.

Hapgood, Fred bidder Harvest, Sep. 1997, p. 58.

NASDAQ; What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug.13, 1997.

The Loan Process, downloaded form www.sdtech.com/mls/process on Aug. 7, 1997.

Trade–Direct: We Help You Trade With Confidence, selected pages downloaded from www.trade–direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security , ACM Press, 117–124 (Apr. 1997).

Bryant, Adam, "Shaking Up Air Fares' Status Quo", The New York Times, Mar. 31, 1997.

Silverman, Robert, "GM Drives Wed Ad Insertion Network", Inside Media, Feb. 26, 1997, vol. 9, No. 4, p. 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real–Time Travel Auction Service to Be Available Via World Wide Web: ETA To Open Bidding to Consumers," Business Wire, DIALOG Trade & Industry Database (Nov. 4, 1996).

Gessel, Chris, "Trade Smarter: The Limit of Orders", Investor's Business Daily, Oct. 14, 1996, p. A1.

CREST: Cruise/Ferry Revenue Management System, selected pages downloaded from www.rtscorp.com on Aug. 5, 1996.

Nishimoto, Lisa "Travel Services Are First Online Commerce Offerings to Fly," Infoworld, Jul. 29, 1996, downloaded from http://www.infoworld.com.

About Rate Hunter, dowloaded from http://207.49.64.77//rhprodrh.htm on Jul. 14, 1996.

Cathay Pacific Online Ticket Bidding, World Internet News Digest (May 8, 1996).

Sothbey's General Information, downloaded from www-.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft–Uniform Commercial Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales",C878 ALI–ABA 335, Dec. 9, 1993.

Hainer, Cathy and Grossman,Cathy Lynn, "Where Vacationing Kids Get Good Care", USA Today, Apr. 1, 1992, at p. 4D.

Del Russo, Laura, "Ticket–Bidding Firm Closes Its Door," Travel Weekly, Mar. 12, 1992.

"Newsletters", The Atlanta Constitution, Mar. 1, 1992, p. K13.

"CRTL's Blue Ribbon Deals for 1992", Consumer Reports Travel Letter, Jan. 1992, vol. 8, No. 1, at pp. 3–5.

Traveler's Notes; Bookit Report, Consumer Reports Travel Letter, Dec. 1991 at p. 143.

Feldman, Joan M., "To Rein In Those CRSs; Computer Reservation Systems", Air Transport World, Dec. 1991, at p. 89.

"Money Briefs; Buy Low, Fly High", Gannet News Service, Nov. 20, 1991.

"Buy Low, Fly High", USA Today, Nov. 14, 1991 at p. 15.

Traveler's Notes; Easier Airfare Bidding, Consumer Reports Travel Letter, Oct. 1991 at p. 119.

Nelson, Janet "Practical Traveler; Airlines Relaxing Policy on No–Refund Tickets", The New York Times, Sep. 22, 1991 at p. 3 of Section 5.

Pelline, Jeff, "New Service; Now You Can Make a Bid on Your Next Airline Ticket Home", The Orange County Register, Sep. 1, 1991 at p. E01.

"Bookit Airfare Bidding System (Fax for Your Plane Ticket?)", Consumer Reports Travel Letter, Sep. 1991, pp. 97 & 106.

Upton, Kim "French Say Monoliths Off–limits to Visitors", Los Angeles Times, Aug. 25, 1991.

Pelline, Jeff, "Travelers Bidding on Airline Tickets; SF Firm Offers Chance for Cut–Rate Fares", San Francisco Chronicle, Section A4, Aug. 19, 1991.

Carey, Christopher, "Firm Offers Auction For Airline Tickets", St. Louis Post–Dispatch, Aug. 7, 1991 at p. 1B.

Del Rosso, Laura, "Marketel Says It Plans to Launch Air Fare 'Auction' in Jun.", Travel Weekly, Apr. 29, 1991.

NASDAQ Adds Enhancements to SOES Limit Order File, Securities Week, Nov. 26, 1990, p. 5.

Ritter, Jeffrey B., "Scope of the Uniform Commercial Code: Computer Contracting Cases and Electrical Commercial Practices", 45 Bus. Law 2533, Aug., 1990.

Greenburg, Peter, S., "Judging DeRegulation", The Record, Jul. 22, 1990 at p. T01.

Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.

Wallace, David, "Company Planning to Let Fliers Bid on Airfares", Philadelphia Business Journal, Mar. 26, 1990 at p. 15.

"Letter to Business Extra", The San Francisco Chronicle, Dec. 26, 1989 at p. C7.

Schrage, Michael, "An Experiment in Economic Theory; Labs Testing Real Markets", The Record Section B1, Nov. 26, 1989.

Schrage, Michael Innovation/Michael Schrage: Laboratory Experiments with Market Economics, Los Angeles Times, Nov. 23, 1989 at p. D1.

Golden, Fran "AAL's Riga Doubts Marketel's Appeal to Retailers", Travel Weekly, Nov. 13, 1989.

Del Rosso, Laura, Firm Proposes ticket–bidding system; Marketel explores electronic auction of travel; Marketel International., Travel Weekly, Section No. 91, vol. 48, p. 1; Nov. 13, 1989.

Carlsen, Clifford, "Polaris Group Set to Fly the Leveraged Sky", San Francisco Business Times, Nov. 6, 1989 at p. 1.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at p. 17.

"Public May Submit Bids To Get Bargain Rates", Wall Street Journal, Section 2; p. 1, Column 1; Aug. 1, 1989.

American Airlines Internet Silent Auction, selected pages downloaded from www.americanair.com.

Apollo Host Computer, selected pages downloaded from www.appollo.com.

"Auctioning unsold airline tickets." (http://www.newciv.org/GIB/BOV/BV–409.HTMl), at p. 1.

Cathay Pacific:CyberTraveler Auction #3—Official Rules, selected pages downloaded from www.cathaypacific.com.

CSM Online: About Collector's Super Mall downloaded from www.csmonline.com.

Sabre Decision Technologies, selected pages downloaded from www.sabre.com.

PhoneMiser: Frequently Asked Questions, downloaded from www.phonemiser.com.

The United Computer Exchange: How It All Works, selected pages downloaded from www.uce.com.

Tired of Shopping For the Best Home Loan?, Mortgage Loan Specialists.

LANCORP Mortgage Services, http://www.lancorp–mortgage.com/retailpa.htm, 1998.

Inland Mortgage Corporation, http://inlandmortgage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.

Coleman, Zach, "Electronic Trading System Matches Buyers, Seller", Atlanta Business Chronicle, vol. 20; No. 12; p. 37A, Aug. 22, 1997.

"What's Holding Up E–Cash?", Cybernautics Digest, vol. 3; No. 7, Finance.

Resnick, Paul et al., "Roles For Electronic Brokers", http://ccs.mit.edu/CCSWP179.htm 1997.

Philatelists Online Information, http://www506.bonsai.com/q/@1313541hyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade–direct, http://www.trade–direct.com. 1997.

"Internet Mortgage Service Eliminates Loan Agents and Passes Commissions on to the Consumer", Yahoo! Finance, 1997.

Negroponte, Nicholas, "Pay Whom Per What When, Part 2", NEGROPONTE, Issue 5.03, 1997.

"Ticketing revolution Could Triple Airline Profits, Analyst Says", Aviation Daily, vol. 325; No. 11; p. 87, 1996.

"Auctioning Unsold Airline Tickets", adapted extract from Insight (USA), The Global Ideas Bank, 1996.

Rockoff, Todd E., et al., "Design of an Internet–based system for remote Dutch auctions," Internet Research: Electronic Networking Applications and Policy, vol. 5, No. 4, pp. 10–16, 1995.

Franklin, Matthew K., et al., "The Design and Implementation of a Secure Auction Service," Proceedings: 1995 IEEE Symposium on Security and Privacy, pp. 2–14, 1995.

Tenenbaum, Jay M., et al., "CommerceNet: Spontaneous Electronic Commerce on the Internet," 1995 IEEE Spring Conference, pp. 38–43.

Sirbu, Marvin and Tygar, J.D., "NetBill: An Internet Commerce System Optimized for Network Delivered Services," IEEE 1995 Spring Conference, pp. 20–25.

Bunker, Ted, "How Auction Technology Sped And Enhanced Sale Of Radio Licenses," Investor's Business Daily, Executive Update, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1–18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire, Mar. 14, 1994.

Freeman, Brian and Gideon, Lidor, "Hosting Services—Linking the Information Warehouse To the Information Consumer," IEEE 1994 Spring Conference, pp. 165–171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order For Business & Leisure Travel", Marketel International, Inc., 1991.

Inhaber, Herbert, "How To Solve the Problem of Siting Nuclear Waste," Transactions of the American Nuclear Society, vol. 62, Nov. 11–15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237–253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way To Purchase Travel, Automated Service Would Let Companies Bid For Already–Filled Airline Seats", Business Travel News, Nov. 6, 1989.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AUCNET: TV Auction Network System," Harvard Business School, Jul. 19, 1989.

Sammer, Harald W., "Online Stock Trading Systems: Study of an Application," IEEE 1987 Spring Conference, pp. 161–162.

Littlefair, T., "Homelink: a unique service," Computer Bulletin, pp. 12–14, Jun. 1986.

Banatre, Jean–Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79–90, 1985.

Banatre, Michel, "Distributed auction bidding system," IPC Business Press, Computer Communications, vol. 4, No. 4, Aug. 1981.

Kempner, M.; "Look for Olympic Tickets to Begin Arriving this Month," The Atlanta Journal and Constitution, Local Olympics, P. 01B, May 8, 1996 (2 pages).

"Paper That Can Keep A Secret," Financial Times, Section I, Technology, p. 20, Feb. 27, 1990 (1 page).

Associated Press; "Firm Hoping For Big Future In Sales Of Copy–Proof Paper," Chicago Tribune, Business, p. 17, Jun. 23, 1986 (1 page).

Jones, C. "James River's Security Papers Aimed At Taking A Bite Out Of Crime," The Richmond Times Dispatch, City Edition, Metro Business, p. D–12, Nov. 27, 1995 (2 pages).

Hutchinson, R., "High–Tech Theft, High–Tech Solution," Wichita Business Journal, vol. 12, No. 12, p. 1, Mar. 14, 1997 (3 pages).

Tucker, T., "Security & Controls: Georgia Pacific Check Paper Equipped With Scratch Test," The American Banker, Technology/Operations, p. 14, Jan. 25, 1995 (2 pages).

Gilmore, C., "Technology Is Fueling The Rise Of Check Fraud," Kansas City Business Journal, vol. 12, No. 31, Sec. 1, p. 3, Apr. 22, 1994 (2 pages).

Armstrong, M.W., "Its Printer's Inks Make Products One Of A Kind," Philadelphia Business Journal, vol. 11, No. 36, Sec. 1, p. 3, Nov. 9, 1992 (3 pages).

"Inexpensive Safeguards Available," St. Louis Post–Dispatch, Business Plus, p. 13, Apr. 6, 1992 (2 pages).

Schmitt, M.; "Cavs Game Brightens Teen's Day; Season Ticket Holder Working With Hospital," the Plain Dealer Reporter, Sports, p. 4D; Jan. 11, 1997 (2 pages).

"TravelWeb Air Reservation Retrieval,": http://www.travelweb.com/travelweb/global/comingsoon.html, Mar. 11, 1997 (1 page).

"Late Show With David Letterman Ticket Exchange," http://www.gettysburg.edu/~S366753/lateshow/tix.html (2 pages).

"Air Travel," http://www.washington.edu/admin/travel/air.travel.html#unused.tickets (2 pags).

"Booking With Timmi," http//www.yomi.fi/timmi/timglish.html (8 pages).

"Reservations, Cancellations And Refunds," http://www.sunshine.net/www/100/sn0156/cancel1.htm (1 page).

"Round–Up And Happy Canyon Ticket Information," http://www.ucinet.com/~roundup/ruticks. htm (2 pages).

pg,29

* cited by examiner

EVENT TABLE 500

| EVENT ID 502 | EVENT TYPE 504 | DESCRIPTION 506 | VENUE ID 508 | DATE 510 | TIME 512 |
|---|---|---|---|---|---|
| E001 | NHL | NJ DEVILS AT NY RANGERS | MSG | 5/6/97 | 7:30 PM |
| E002 | THEATER | CATS | SCHU | 5/11/97 | 2:00 PM |
| E003 | CONCERT | MICHAEL JACKSON | OMNI | 5/12/97 | 8:00 PM |

VENUE TABLE 520

| VENUE ID 522 | NAME 524 | ADDRESS 526 |
|---|---|---|
| OMNI | OMNI AUDITORIUM | ATLANTA, GA |
| SCHU | SCHUBERT THEATER | NEW HAVEN, CT |
| MSG | MADISON SQUARE GARDEN | NEW YORK, NY |

CUSTOMER TABLE 530

| CUSTOMER ID 532 | NAME 534 | ADDRESS 536 | CREDIT CARD NUMBER 538 | EXP. DATE 540 | CARD HOLDER 542 |
|---|---|---|---|---|---|
| 1000 | BILL SMITH | 123 MAIN STREET, ATLANTA GA | 1111-1111-1111-1111 | 9/99 | WILLIAM SMITH |
| 2000 | JILL JANSON | 456 RED DRIVE, ATLANTA GA | 2222-2222-2222-2222 | 6/01 | JULIA JANSON |
| 3000 | ERIC WHITE | 789 GREEN STREET, CHICAGO IL | 3333-3333-3333-3333 | 8/98 | FRANK WHITE |
| 4000 | SUE BLACK | 101 PINK AVENUE, NORWALK CT | 4444-4444-4444-4444 | 9/02 | SUSAN BLACK |

OFFER TABLE 550

| OFFER ID 551 | CUST ID NUMBER 552 | EVENT ID 553 | OFFER DATE 554 | CLOSE DATE 555 | TYPE 556 | STATUS 557 | QTY 558 | BEGINNING SECTION 559 | BEGINNING ROW 560 | BEGINNING SEAT 561 |
|---|---|---|---|---|---|---|---|---|---|---|
| 0111 | 1000 | E003 | 4/1/97 | 5/12/97 | BUY | PENDING | 4 | 001 | 001 | 001 |
| 0222 | 3000 | E002 | 3/15/97 | 5/11/97 | SELL | ACTIVE | 2 | 005 | 005 | 010 |
| 0333 | 4000 | E001 | 4/20/97 | 5/6/97 | BUY | EXPIRED | 4 | 001 | 001 | 001 |
| 0444 | 4000 | E001 | 4/20/97 | 5/6/97 | BUY | FULFILLED | 2 | 001 | 001 | 001 |

| SECTION ENDING 562 | ROW ENDING 563 | SEAT ENDING 564 | PRICE PER UNIT 565 | AUTH. AMT 566 | TRANS ID 567 | LINK ID 568 | TICKET NUMBER(S) 569 |
|---|---|---|---|---|---|---|---|
| 999 | 999 | 999 | $150.00 | $600.00 | | | |
| 005 | 020 | 011 | $125.00 | $250.00 | | | 416780 416790 |
| 001 | 001 | 999 | $250.00 | $1,000.00 | | O444 | |
| 001 | 001 | 999 | $200.00 | $1,000.00 | TR001 | 0333 | |

TICKET TABLE 610

| EVENT ID 611 | TICKET NUMBER 612 | SECTION 614 | ROW 618 | SEAT 620 |
|---|---|---|---|---|
| E001 | 667911 | 001 | 001 | 001 |
| E001 | 667912 | 001 | 001 | 002 |
| E001 | 667913 | 001 | 001 | 003 |
| E001 | 667914 | 001 | 001 | 004 |

622 624

REPLACEMENT TICKET TABLE 630

| EVENT ID 631 | TICKET NUMBER 632 | BUYER ID 640 | REPLACEMENT NUMBER 642 |
|---|---|---|---|
| E001 | 667913 | 4000 | NT665128 |
| E001 | 667914 | 4000 | NT665128 |

CONDITIONAL PURCHASE OFFER MANAGEMENT SYSTEM FOR EVENT TICKETS

CROSS-REFERENCE TO RELATED APPLICATIONS

This is a continuation-in-part of U.S. Patent Application Ser. No. 08/889,319 filed Jul. 8, 1997 USP 6,085,169 which is a continuation-in-part of U.S. Patent Application Ser. No. 08/707,660 filed Sep. 4, 1996 USP 5,794,207 and U.S. application entitled "Method and System for Controlling Access to a Venue using Alterable Tickets," U.S. Patent Application Ser. No. 08/916,656 (Attorney Docket No. "WD2-97-052") filed Aug. 22, 1997, each incorporated by reference herein.

The present invention is related to the following United States Patent Applications filed contemporaneously herewith: "Conditional Purchase Offer Management System for Packages," U.S. Patent Application Ser. No. 08/923,317 (Attorney Docket No. WD2-97-065); "Conditional Purchase Offer Management System for Telephone Calls," U.S. Patent Application Ser. No. 08/923,317 (Attorney Docket No. WD2-97-028); "Conditional Purchase Offer Management System for Cruises," U.S. Patent Application Ser. No. 08/923,618 (Attorny Docket No. WD2-97-069); and "Conditional Purchase Offer and Third-Party Input Management System," U.S. Patent Application Ser. No. 08/923,524 (Attorney Docket No. WD2-97-067), each assigned to the assignee of the present invention and incorporated by reference herein.

TECHNICAL FIELD

This invention relates generally to a method and system for facilitating the remote purchase and sale of tickets, and more particularly, to a method and system for electronically facilitating buying and selling tickets for an event, such as the ballet, theater or a sporting event.

DESCRIPTION OF THE RELATED ART

Attending an event such as a concert, play, or sporting event generally requires purchasing a ticket in advance. Tickets are traditionally provided by the venue hosting the event and are sold at the venue's box office. Tickets are also available through ticket distributors, in coordination with the hosting venue and the event promoter. Aside from the venue box office, tickets are also available through ticket outlets, ticket brokers, telephone sales, remote ticket printing applications, ticket kiosks and Internet web sites.

It is not uncommon, however, for a venue to sell out quickly for a particular event, whereby available tickets are limited to ticket brokers and "scalpers." For instance, a popular concert may sell out well before many people interested in attending are aware that the original tickets are available. Thus, these individuals are forced to explore the resale market.

Resellers of tickets are limited in their ability to advertise availability to the public. Resellers may rely on classified advertisements in the newspaper, electronic bulletin boards, established contacts or "chat rooms" on the Internet. Also, resellers usually must complete sales either through the mail, or in person.

A number of shortcomings, however, exist for both buyers and sellers in the present resale market. First, the aforementioned methods of advertising are generally neither efficient nor flexible. The cost of advertising often outweighs the marginal profit gained through advertising, particularly for a single ticket. For instance, an advertiser may pay $30 for a classified ad that results in an additional profit of only $15. Moreover, advertisements are difficult to remove from the public realm once tickets are resold. Thus, a person selling a ticket may get many telephone inquiries after the ticket has been sold. Further, advertising is especially difficult because many transactions need to be completed just before an event occurs. This is problematic because the buyer requires the ticket to attend the event, and delivering the ticket immediately prior to the event may be difficult. Presently, ticket sellers are often forced to leave tickets at will-call windows or with local proprietors for pick up.

Related shortcomings with the current resale market are timing and delivery. Ticket resellers may not have tickets available until very near to the start time of a particular event, and buyers may not decide to attend an event until shortly before it begins. Specifically, the prior art does not allow substantially immediate efficient consummation of an offer to purchase or sell tickets. Accordingly, there is not a system that solves the problems associated with reselling tickets on the day of the event.

For example, if a person holding a ticket to a hockey game discovers two hours before the game begins that he cannot attend, his options for reselling his ticket are severely limited. His best chance to resell his ticket is to stand outside the arena and hope to find a buyer for the ticket. Such conduct is illegal in most states. Using a similar example, if a person decides he would like to attend that game two hours before it begins, his best option to acquire a ticket is to appear outside the arena and search for a ticket reseller. In both cases, the options presented to both the buyer and the seller are limited to particularly inconvenient and unpredictable ways of purchasing and reselling tickets.

Finally, potential buyers often possess a general distrust of ticket resellers. The act of ticket reselling is often perceived as illegal, and potential buyers are sometimes unhappy about resale prices that are significantly higher than those originally determined by the venue. As a result, buyers simply do not trust ticket resellers, but are often forced to use them as a last resort to purchase tickets. Markups on marquis events can often be as high as 500%. Further, unless a buyer is face-to-face with a ticket reseller, the buyer is typically unwilling to pay for tickets without some assurance of delivery. Likewise, a ticket reseller is typically unwilling to deliver tickets without payment in advance.

SUMMARY OF THE INVENTION

The problems identified above are solved and a technical advance is achieved by providing, in accordance with the present invention, a system and method for purchasing a ticket for a specified event on a specified date at a specified price.

A method according to the preferred embodiment of the present invention includes: a potential buyer electronically transmitting a guaranteed purchase offer for a ticket to a central controller; the central controller electronically making the offer available to a plurality of potential sellers; a first-accepting seller transmitting an acceptance of the offer to the central controller; and the central controller transmitting this acceptance to the buyer along with a code to use at a venue to verify his purchase of the ticket.

Thus, the preferred embodiment of the present invention provides individuals a quick and easy way to purchase a ticket from a ticket reseller, and allows them to avoid the traditional problems of the ticket resale market. Moreover, ticket resellers can sell a ticket based on a guaranteed purchase offer provided by a potential buyer. In addition, the present invention includes mechanisms which prevent fraud both during and after the transaction.

Further aspects of the present invention will become apparent during the course of the following detailed description and by reference to the attached drawings.

BRIEF DESCRIPTION OF THE DRAWINGS

FIG. 5a is a table illustrating the contents of an event table used in the system of FIG. 1;

FIG. 5b is a table illustrating the contents of a venue table used in the system of FIG. 1;

FIG. 5c is a table illustrating the contents of a customer table used in the system of FIG. 1;

FIG. 5d is a table illustrating the contents of an offer table used in the system of FIG. 1;

FIG. 6b is a table illustrating the contents of a replacement ticket table used in the system of FIG. 1.

DETAILED DESCRIPTION

A method and apparatus of the present invention will now be discussed with reference to FIGS. 1–7g. The present invention allows a buyer to present a guaranteed purchase offer for a ticket to a certain event, such as a hockey game, to a number of potential sellers. The sellers may review the offer, and accept the offer if the terms are agreeable. Thus, a buyer may quickly submit an offer to purchase tickets which are guaranteed to be delivered in a safe, convenient manner.

System Architecture

Figure 1:
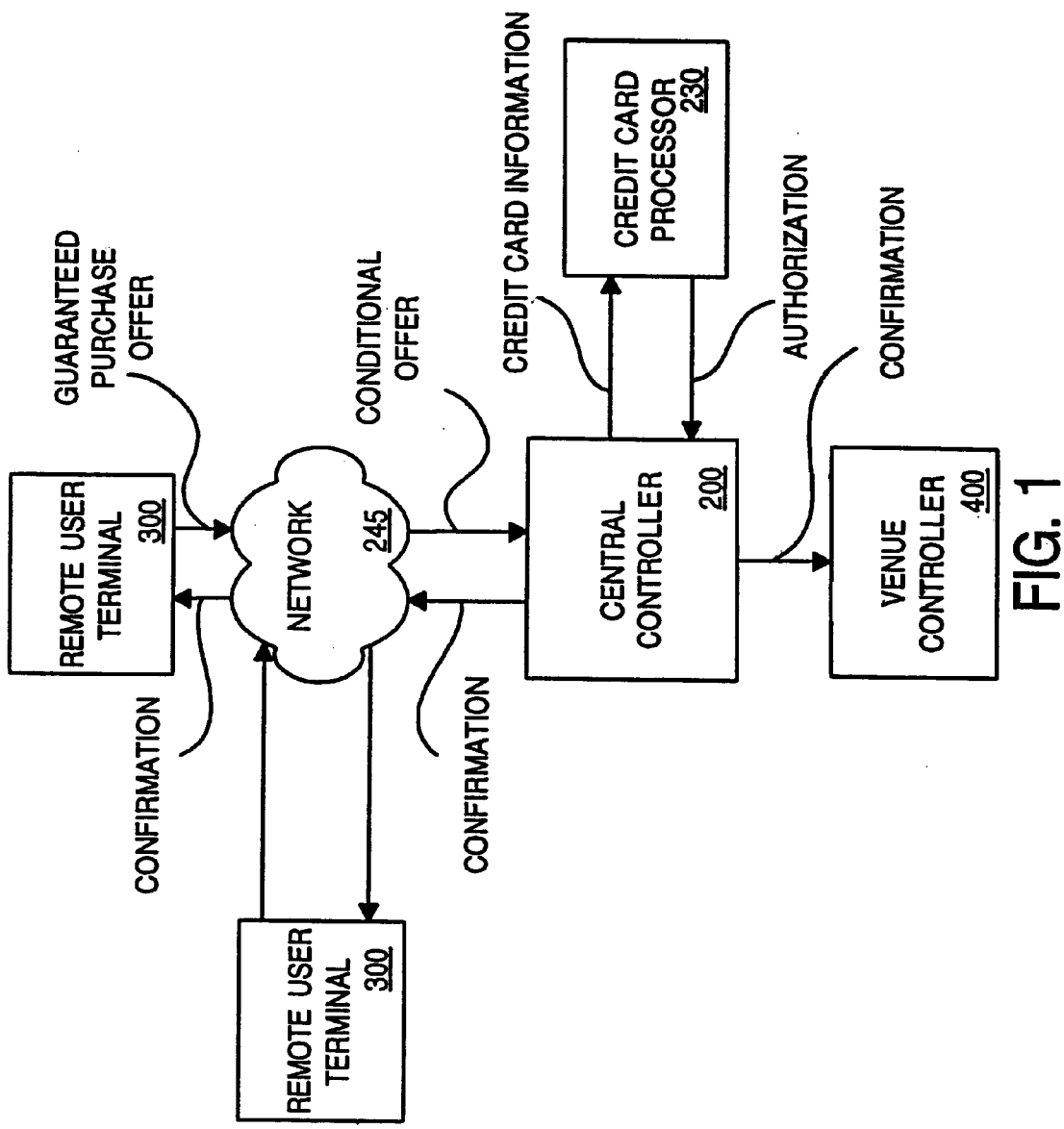
FIG. 1 is a schematic view of a system according to one embodiment of the present invention.

With reference to FIGS. 1–6, the system architecture of one embodiment of the apparatus and method of the present invention is illustrated. As shown in FIG. 1, the apparatus of the present invention generally comprises a venue controller 400, a central controller 200, a credit card processor 230 and a remote user terminal 300. The remote user terminal 300 is connected to the central controller 200 through a network 245.

Using the above components, the present embodiment of the invention provides a method and apparatus to allow a central controller to facilitate the purchase and sale of event tickets. Specifically, central controller 200 receives and posts offers to purchase tickets for a particular event. Such offers are guaranteed, for example, using a line of credit on a credit card account. Central controller 200 further makes each offer available to a plurality of potential sellers, and allows sellers to accept the offer and thereby form a legally binding contract.

Figure 2:
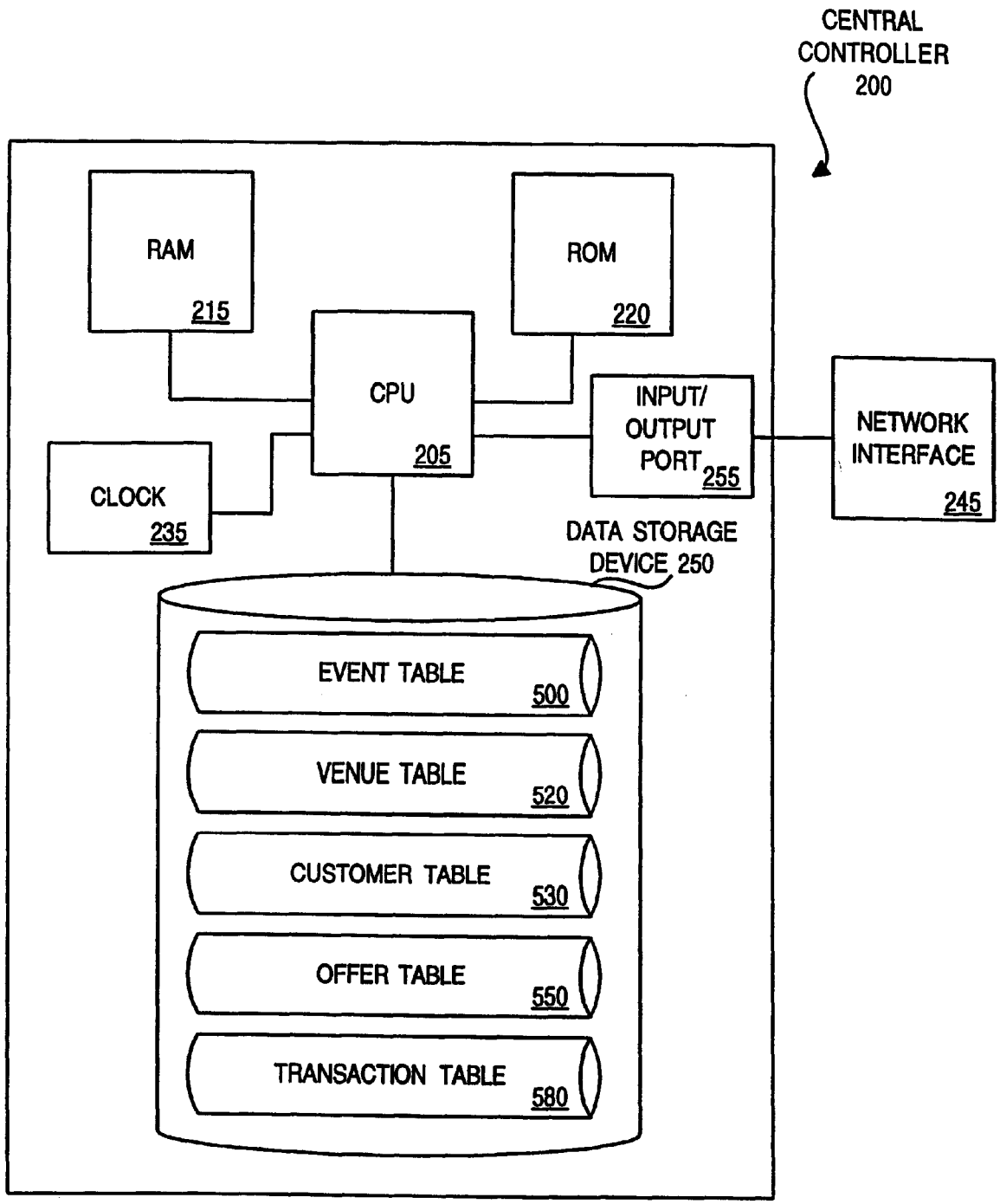
FIG. 2 is a schematic view of a central controller used in the system of FIG. 1.

As shown in FIG. 2, central controller 200 includes central processing unit (CPU) 205, random access memory (RAM) 215, read only memory (ROM) 220, clock 235, input/output ("I/O") port 255, and data storage device 250. The data storage device 250 is a memory device containing an event table 500, a venue table 520, a customer table 530, an offer table 550, and a transaction table 580, discussed in greater detail with reference to FIGS. 5a through 5e, respectively.

Central Controller Data Tables

FIG. 5a illustrates an exemplary event table 500 that preferably stores information on events for which tickets may be resold using the system of FIG. 1, including location and scheduling information. Event table 500 maintains a plurality of records, such as record 514, each associated with a different event. For each event identifier listed in event ID field 502, event table 500 includes an event type code stored in field 504 and an event description stored in field 506. The event type code stored in field 504 represents the format of the event, for instance, a National Hockey League game is denoted as "NHL." The event description stored in field 506 describes the specific event.

Event table 500 also preferably includes a venue ID stored in field 506. The venue ID stored in field 506 may be utilized, for example, to index venue table 520, more fully described with reference to FIG. 5b. As shown in FIG. 5a, each record stored in event table 500 further includes a date stored in field 510 and a time stored in field 512. The date and time of fields 510 and 512, respectively, represent the starting time of the event associated with the record. The information stored in this table may be supplied to the central controller 200 from any number of sources, including promoters, venues and potential buyers and sellers.

FIG. 5b illustrates an exemplary venue table 520. Each record of venue table 520, such as record 528, preferably stores data associated with and describing a venue. Venue table 520 is preferably indexed by field 522 which stores a unique venue identifier. Venue table 520 further stores a theater, auditorium or stadium name in field 524 and an address in field 526.

FIG. 5c illustrates an exemplary customer table 530 which preferably stores information on each customer registered with the electronic ticket sales system. Customer database 530 maintains a plurality of records, such as records 546 and 548, each associated with a different customer. Customers registered in customer table 530 may buy tickets, sell tickets or both buy and sell tickets. Customer table 530 stores a unique customer identifier for each customer in field 532 and name and address information in fields 534 and 536. Preferably, the data maintained in customer table 530 is provided by the customer during a registration process, at which time the customer is assigned a unique customer identifier.

Customer table 530 further stores customer credit card data. The customer's credit card number is stored in field 538. The expiration date of the customer's credit card is stored in field 540, and the name of the cardholder as it appears on the credit card is stored in field 542.

FIG. 5d illustrates an exemplary offer table 550 that preferably stores information relating to offers posted using the ticket sales system of the present embodiment. Offer table 550 maintains a plurality of records, such as records 570 and 572, each associated with an offer to buy or sell tickets. Each record of offer table 550 includes a unique offer identifier stored in field 551 that is assigned by central controller 200 when the offer is posted. Each record of offer table 550 includes fields for identifying the customer making the offer, conditions of the offer, the customer accepting the offer, and administrative information related to the offer.

The customer identifier of the customer extending the offer is stored in field 552. Information relating to the customer extending the offer may be easily obtained using the customer identifier of field 552 as an index into customer table 530. Each record in offer table 550 further stores an event identifier in field 553. The event identifier indicates the event to which the offered ticket(s) relate. Information regarding the event may be easily obtained using the event identifier of field 553 as an index into event table 500.

Each record of offer table 550 further includes fields 554 and 555 that store the date the offer was made and the last day on which the offer may be accepted, respectively. Data indicating an offer type and offer status are also stored in each record of offer table 550 in fields 556 and 557. Field 556 stores a code indicating whether the offer is an offer to buy or an offer to sell one or more tickets. Field 557 stores a code indicating the status of the offer. Offer status possibilities include: pending, active, expired and fulfilled.

Field 558 of each record in the offer table stores the number of seats to which the offer applies. Data identifying the location of seats related to the offer populate fields 559–564. In the event an offer requires a range of seat locations, data stored in fields 559–561 are used to identify the first seat in a range, and data stored in fields 562–564 are used to identify the last seat in a range. Field 565 stores the price per seat.

In addition, each record of offer table 550 includes administrative data in fields 566–569. Data stored in field 566 stores an amount of credit authorized to support the offer. Once an offer has been accepted, field 567 stores a transaction identifier that may be used as an index into transaction table 580, discussed more completely with reference to FIG. 5e. Each record of offer table 550 optionally stores a pointer to a related, or linked, offer record. The pointer is stored in field 568 and represents the offer identifier of the next related record in offer table 550. Finally, field 569 of each record of offer table 550 stores one or more serial numbers of the original tickets that a seller would like to sell.

Figure 5E:
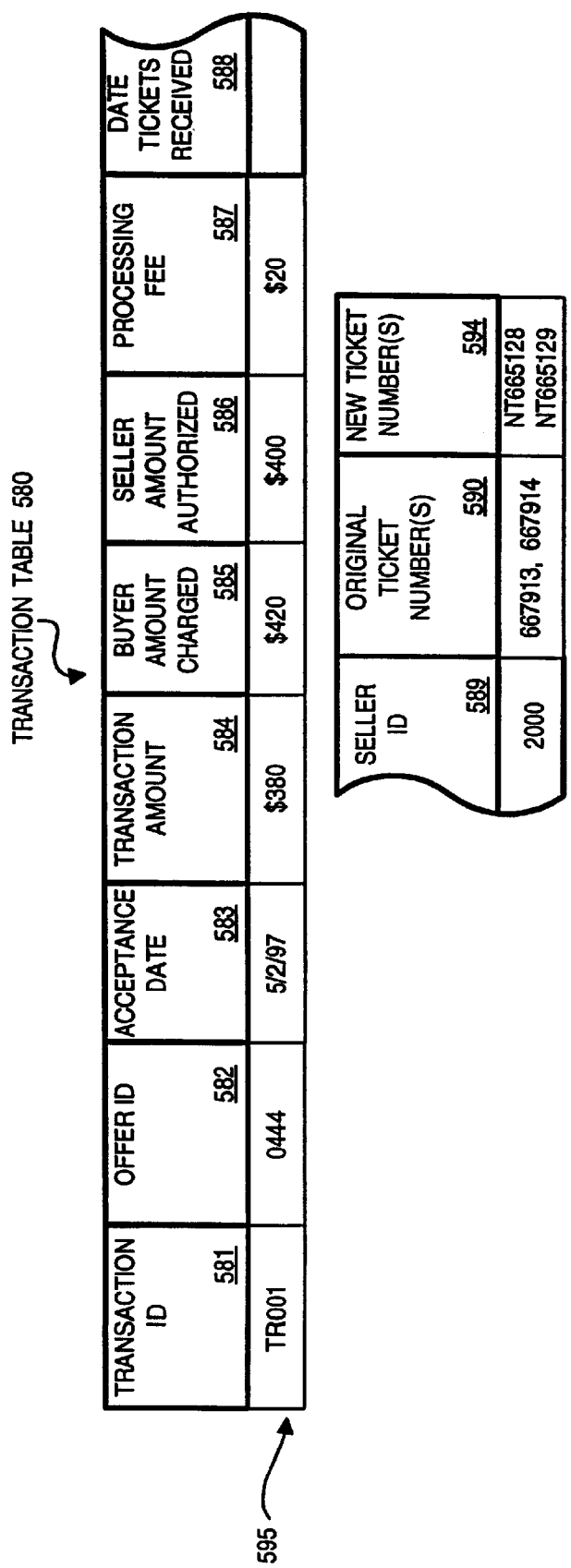
FIG. 5e is a table illustrating the contents of a transaction table used in the system of FIG. 1.

Once an offer is accepted, central controller 200 adds a transaction record to transaction table 580. FIG. 5e illustrates an exemplary transaction table 580 that preferably stores information relating to each accepted offer. Each accepted offer is assigned a unique transaction identifier that is stored in field 581 of transaction table 580 and field 567 of offer table 550. An offer identifier of an associated record in offer table 550 is stored in field 582. This offer identifier may be used as an index into offer table 550 to retrieve information regarding the offer associated with a transaction record.

Each record of transaction table 580 preferably further includes field 583 which stores the date the associated offer was accepted and field 584 which stores the total value of the transaction. Field 585 stores the amount charged to the buyer's credit card; field 586 stores the amount of the seller's credit line reserved to support the acceptance; and field 587 stores the fee charged for processing the transaction. Each record of transaction table 580 also stores a date in field 588 indicating the date the ticket(s) are received by the operator of central controller 200.

The customer identifier of the seller is stored in field 589, and data identifying the ticket(s) is stored in fields 590 and 594. Field 590 stores the original ticket number(s), and field 594 stores new ticket number(s). The new ticket numbers are assigned to distinguish original tickets from resold tickets and promote efficient resolution of potential conflicts between ticket holders.

Optionally, central controller 200 may include a contract detail table (not shown) containing form contract provisions which the central processor 200 retrieves and transmits to users at various times. For example, the contract table may include a contract provision that is transmitted to a buyer and incorporated into the guaranteed purchase offer. The contract table may also include a contract provision which is transmitted to a seller prior to requesting an acknowledgment of his intent to bind a buyer's offer and create a legally binding contract. These form provisions effectively fill the gaps between conditions specified by the buyer, specifying the generic contract details common to most contracts of this nature.

User Terminal

Figure 3:
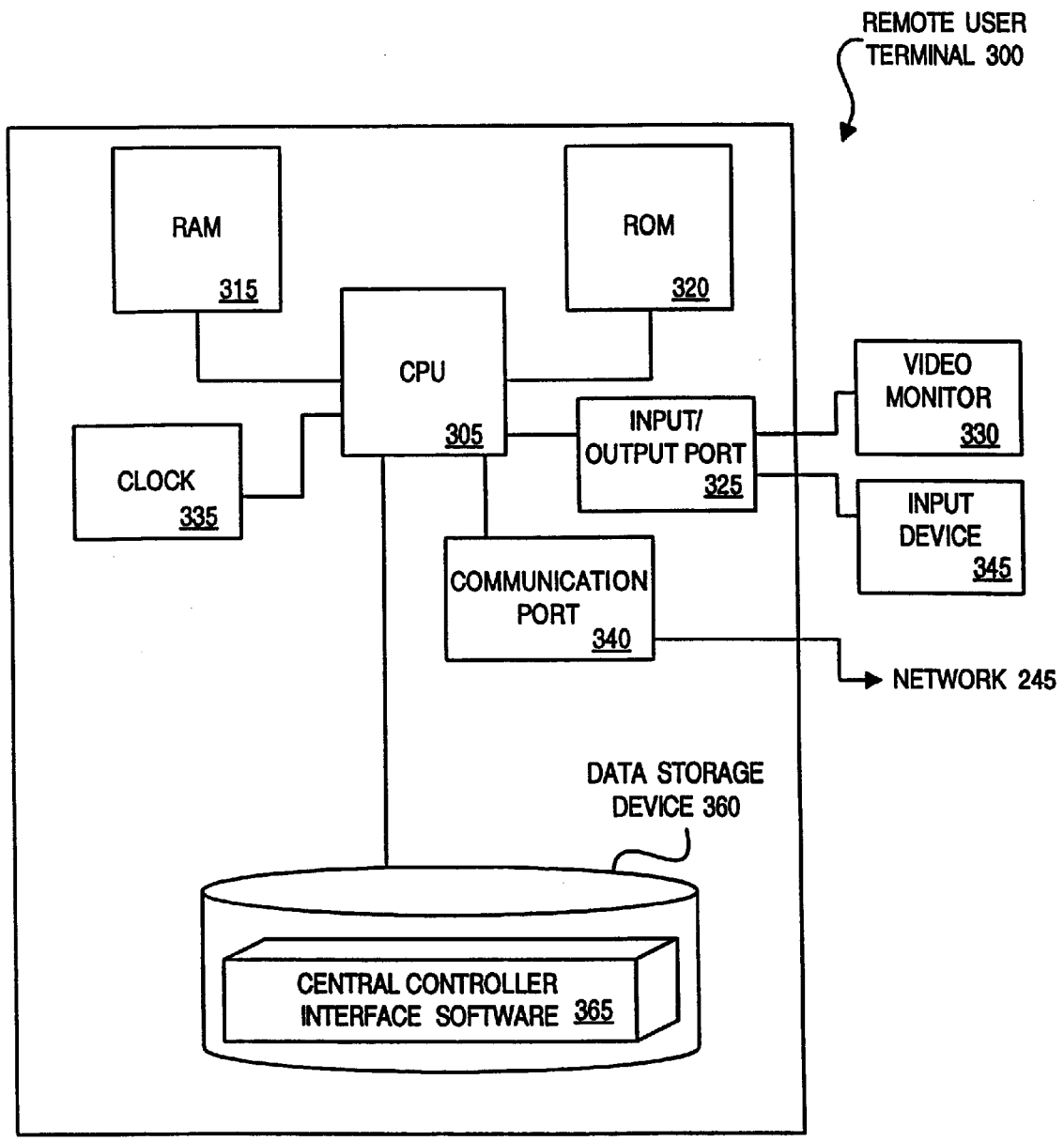
FIG. 3 is a schematic view of a remote user terminal used in the system of FIG. 1.

Referring now to FIG. 3, remote user terminal 300 will now be described in greater detail. Remote user terminal 300 can be a personal computer, screenphone, stand alone kiosk, or any other device through which a customer can access the central controller 200. Remote user terminal 300 generally includes a central processing unit ("CPU") 305 that controls the operation of remote user terminal 300. CPU 305 is electronically connected to a random access memory ("RAM") 315, a read only memory ("ROM") 320, an input/output port 325, a clock 335, a communication port 340 and a data storage device 360. CPU 305 receives inputs from a remote user with the input/output port 325 and an input device 345, such as a keyboard. CPU 305 transmits outputs to a remote user via the input/output port 325 and a video monitor 330. Further, the communication port 340 provides the communication path to network 245. Finally, the data storage device 360 is a memory device containing central controller interface software 365.

Venue Controller

Figure 4:
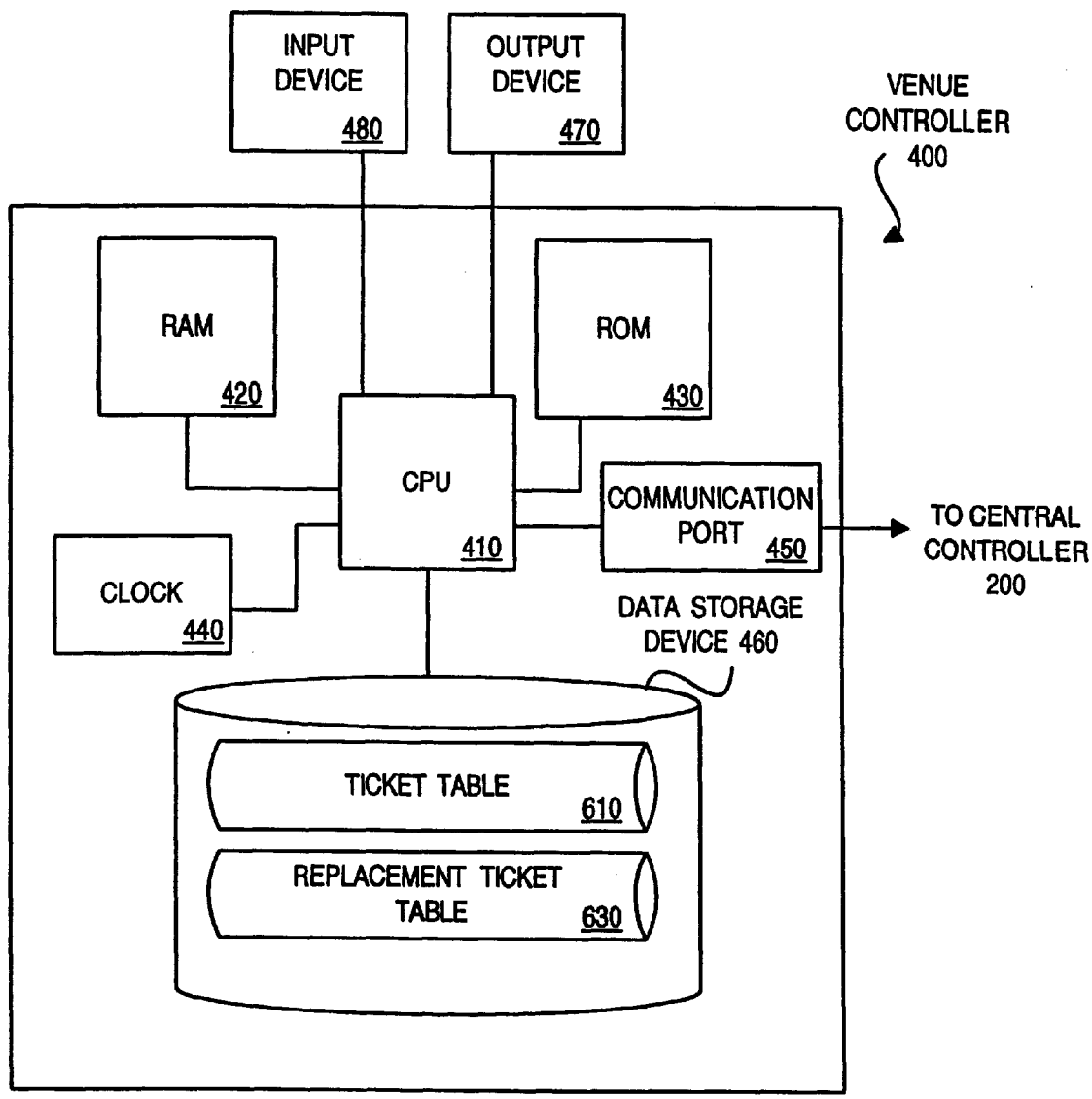
FIG. 4 is a schematic view of a venue controller used in the system of FIG. 1.

Referring now to FIG. 4, venue controller 400 will now be described in greater detail. Venue controller 400 generally includes a central processing unit ("CPU") 410 that controls the operation of venue controller 400. The CPU 410 is electronically connected to a random access memory ("RAM") 420, a read only memory ("ROM") 430, a clock 440, a communication port 450 that provides a communication path to central controller 200, and a data storage device 460. Data storage device 460 is a persistent memory device containing a ticket table 610 and a replacement ticket table 630. Venue controller 400 further includes input device 480 for receiving input data and output device 470 for presenting or displaying information to an operator.

Figure 6A:
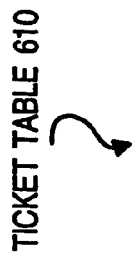
FIG. 6a is a table illustrating the contents of a ticket table used in the system of FIG. 1.

FIG. 6a illustrates an exemplary ticket table 610 that preferably stores information about tickets issued for various seats at a particular venue. Each ticket has a specific ticket number assigned to it by venue controller 400 prior to issuance. Each record of ticket table 610 preferably includes field 611 that identifies the event for which the ticket is valid, field 612 that identifies the number assigned to each ticket issued for an event, and fields 614–620 that represent the location of the seat in the auditorium (i.e. the section, row and seat, respectively). Ticket table 610 could also contain fields representing other information specific to a venue, an event, or a seat.

FIG. 6b illustrates an exemplary replacement ticket table 630 that preferably stores data relating to original ticket numbers that have been voided and assigned replacement ticket numbers. Replacement ticket table 630 stores the ticket numbers that have been resold by the central controller 200 in field 632 and stores the replacement ticket numbers in field 642. Each record of ticket table 630 further includes a field 631 that stores an event identifier and a field 640 that stores a buyer identifier.

It will be recognized by one of ordinary skill that the present invention could be constructed and operated without the illustrated distributed processing architecture. If venues and ticket distributors so desired, central controller 200 could incorporate all or part of the database of venue controller 400 and perform all or part of the processing steps performed by venue controller 400 in the present embodiment. In such an alternate embodiment, data processing and data storage could be centralized, and venues could access the data as appropriate using conventional remote terminals or work stations.

Online Embodiment

In one embodiment of the present invention, communications between potential buyers and sellers take place via an electronic or digital network, such as the Internet, with central controller 200 hosting an Internet web site that users can access or "log on" to by means of a personal computer. It is important to note that users can access the central controller via other communications links such as a conventional telephone line linked to a voice response unit ("VRU").

To use the ticket reselling service, a user who is a potential buyer logs on to central controller 200 through network 245, creates and submits a guaranteed purchase offer, and disconnects from the network 245. In one embodiment, a guaranteed purchase offer is a legally binding offer to purchase tickets that is backed by a pre-authorized credit card transaction. Upon receiving the offer, central controller 200 contacts the buyer's credit card issuer to ensure that the buyer has a valid credit card account and/or sufficient credit to pay for the requested tickets. The guaranteed purchase offer is then made available to potential sellers by posting the offer using the web site linked to central controller 200. Periodic maintenance is performed by central controller 200 to ensure that "active" offers have not expired. A potential seller can use the system of the present invention to browse offers and submit an electronic acceptance of a desirable offer. The acceptance by the potential seller is transmitted electronically to central controller 200. Central controller 200 processes the acceptance and contacts the seller's credit card issuer to ensure that there is sufficient credit to cover a potential penalty for non-performance. This reservation of the seller's credit is intended to promote trust between the parties and, thereby, protect the transaction. After verifying available credit, both parties are notified of the binding transaction, and the tickets are electronically voided and assigned a replacement ticket number. The seller is then required to surrender the voided tickets. This may be accomplished by returning them to the venue, or the seller may mail the tickets to the operator of central controller 200. Upon receiving the surrendered tickets, the operator of central controller 200 directs payment to be transferred to the user selling the tickets.

Figure 7A:
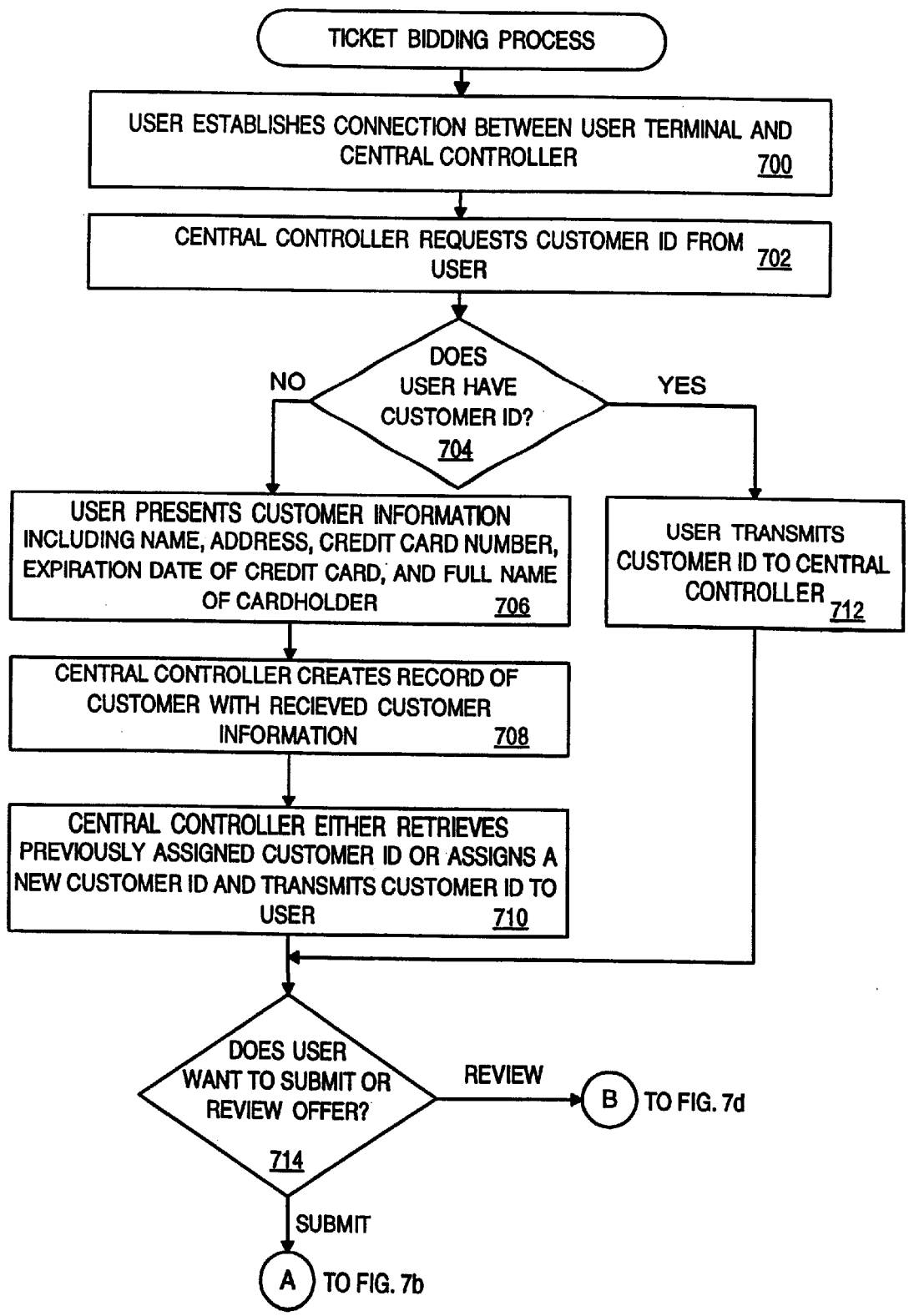
FIGS. 7a–7g are flow diagrams depicting a method of submitting and accepting a guaranteed offer to buy an event ticket over the Internet according to one embodiment of the present invention.

With reference to FIG. 7a, a process by which a user logs on and begins using the system will now be described. As shown in step 700, a user operating a remote terminal 300 establishes a connection with the central controller 200 through network 245. The user may be either a potential buyer wishing to place a guaranteed purchase offer for tickets, or a potential seller wishing to review offers for tickets.

At step 702, central controller 200 requests a customer ID from the user. At step 704, central controller 200 determines how to proceed based on whether or not the user already has a customer ID. If the user is registered with this service, and remembers his customer ID, he transmits his customer ID to central controller 200 at step 712, and the process continues with step 714.

If, on the other hand, the user is not registered with the service, or does not remember his customer ID, he must submit a negative response at step 704 and present relevant customer information to central controller 200, as shown by step 706. At step 708, central controller 200 creates a record of the customer based on the received customer information. This information, including name, address, credit card and number, expiration date, and name as it appears on the credit card, is stored in customer table 530. At step 710, central controller 200 compares the information provided by the user with information already stored in customer table 530. If a match is found, central controller 200 retrieves the customer ID from field 532 of customer table 530, and transmits the customer ID number to the user. This service is provided for users who have given information previously, but do not remember their customer ID number. If no match is found, the central controller 200 assigns a new customer ID to the user, stores it in field 532 of customer table 530, and transmits it to the user.

At step 714 the user indicates whether he would like to submit a guaranteed purchase offer, or review offers from potential buyers. The process steps relating to submitting offers are described more fully with reference to FIGS.

7b–7c. The process steps relating to reviewing offers are described more fully with reference to FIGS. 7d–7g. In an alternative embodiment, the user could also elect to advertise the availability of tickets for a certain event to potential buyers. Furthermore, a user could elect to review such advertisements, to get a better understanding of what a fair price might be, prior to submitting an offer.

Figure 7B:
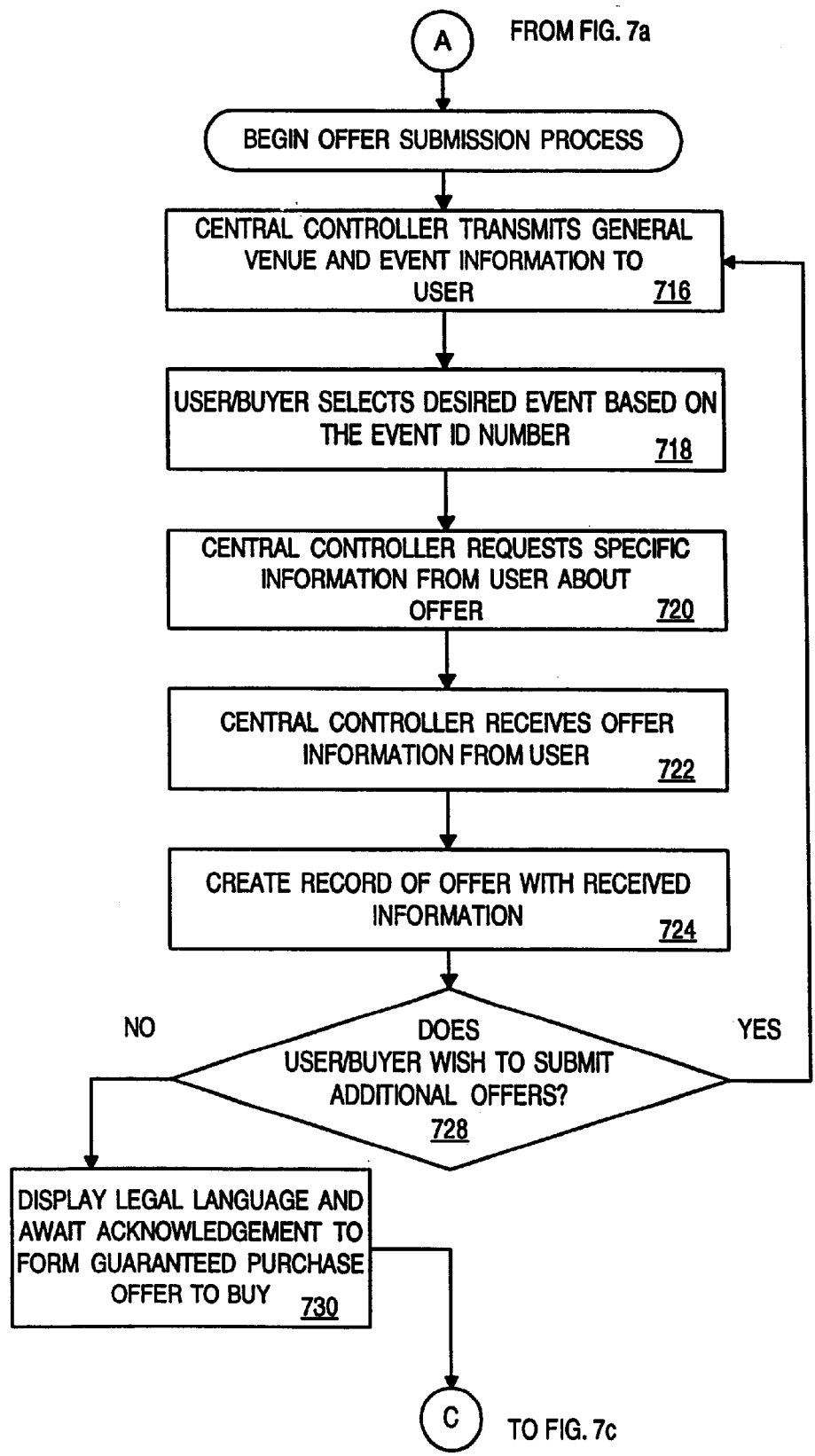
Figure 7C:
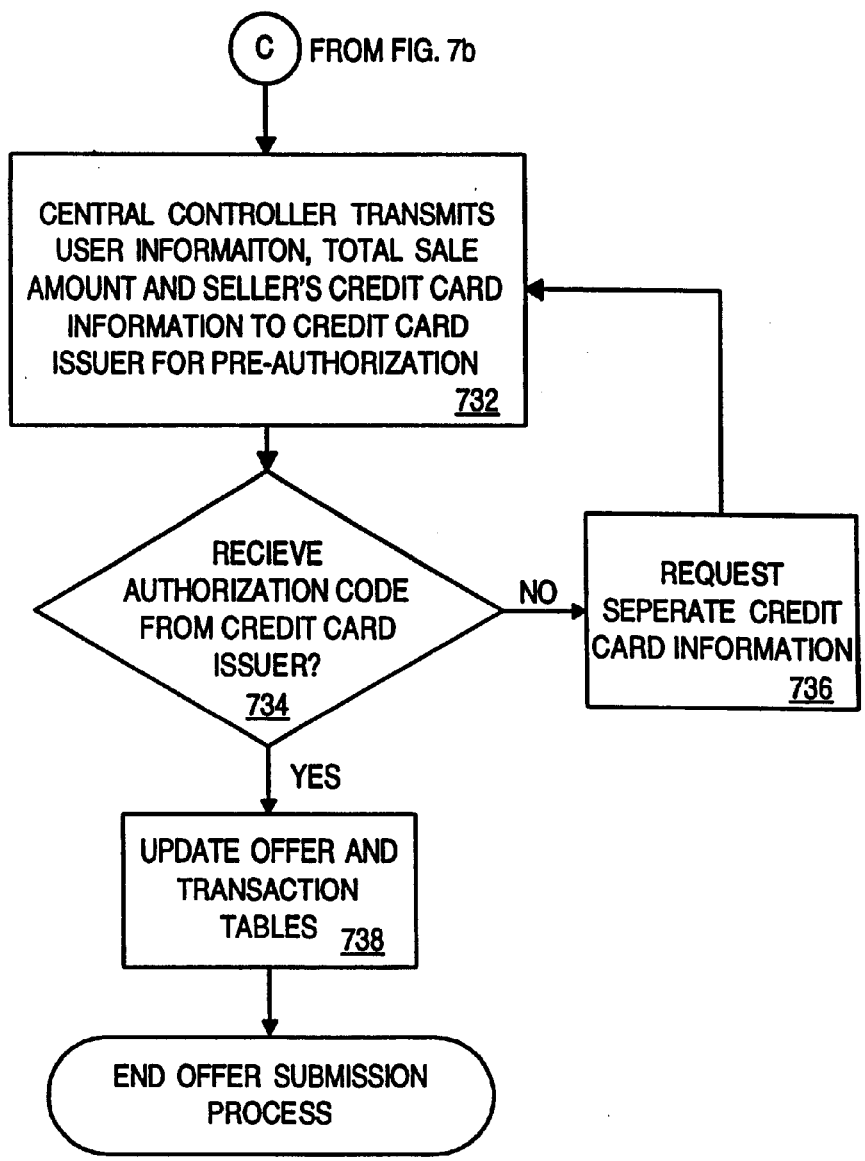
Figure 7D:
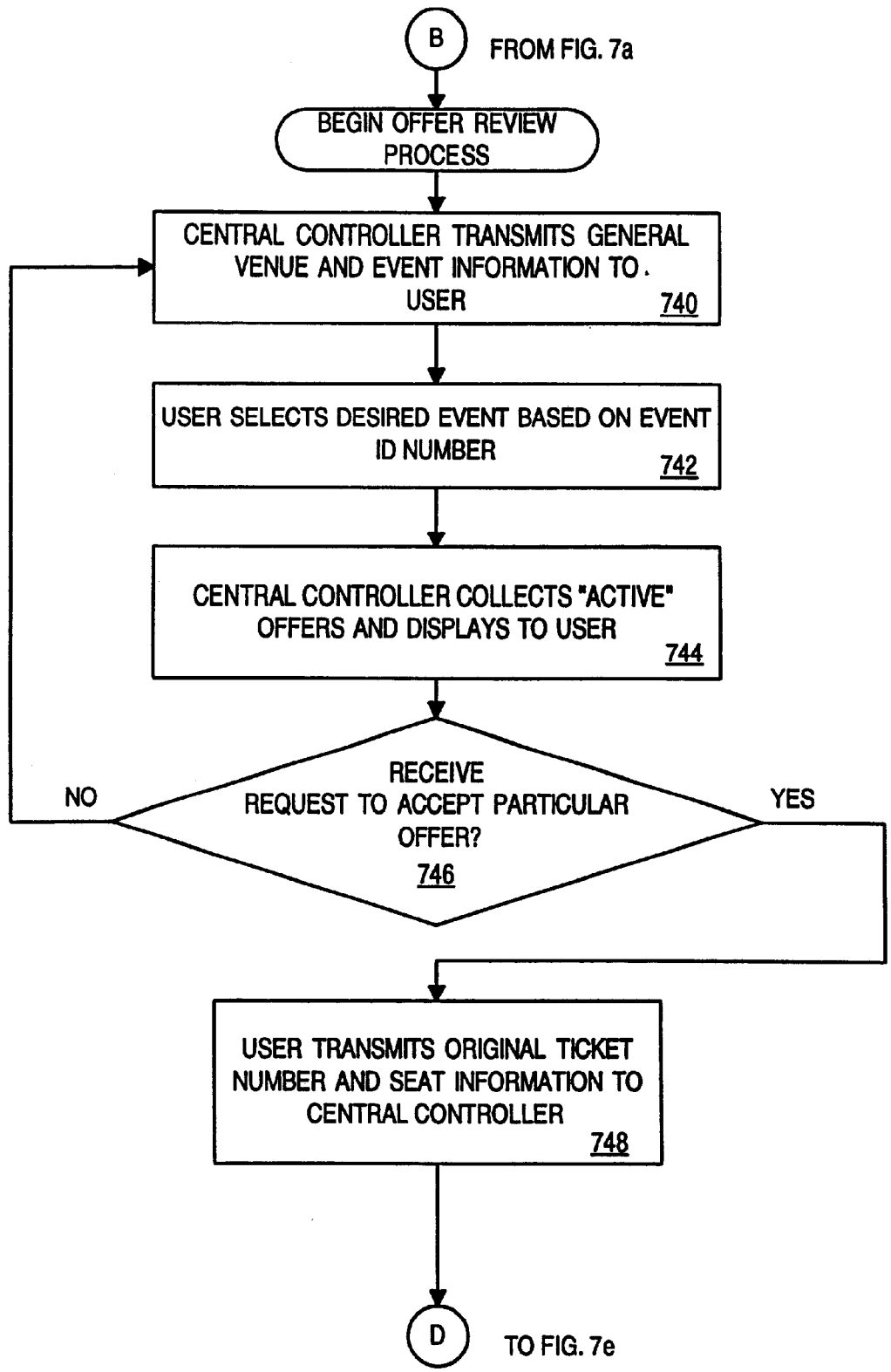

FIGS. 7b and 7c illustrate the process steps executed following the user's choice at step 714 to submit a guaranteed purchase offer. At step 716, the central controller transmits general venue and event information to user terminal 300 for display to the user. For instance, in one embodiment, central controller 200 may provide a number of options to the user in order to pinpoint the specific event that the user would like to attend. The user could directly request a particular event, or proceed through a group of narrowing choices to ultimately find the right event. A user, for example, may be asked to identify any of the fields from event table 500. Depending on the amount of information provided, the choice of events will be narrowed accordingly. For instance, if the user provides only the event type (e.g. "NHL"), central controller 200 scans the event table 500 and provides all matches found in the event type field 504. This may be a long list of events, however, central controller 200 may prompt the user for more information to narrow the list. The user may then select from the narrow list to find the event for which he is looking. For example, the user may specify only Saturday matinee performances of a particular Broadway production in order to narrow the list. Central controller 200 then provides the user with the correct event information, including the event ID from field 502 of the event table 500. The user includes this event ID as part of their guaranteed purchase offer so that it may be tracked by central controller in the offer table 550.

Next, at step 718, the user selects the desired event based on the event ID number. At step 720, central controller 200 requests certain information from the user pertaining to the offer, such as (1) the number of tickets desired;
(2) the price for each ticket;
(3) the location desired for each ticket; and
(4) optionally, a date through which the offer is valid.

The user indicates the number of tickets he would like and the price he is willing to spend, based on the particular location of the tickets. The user may choose the exact location of seats that correspond to the price he is willing to pay using a graphical representation of the venue. For instance, based on the venue ID number (stored in field 522 of venue table 520), central controller 200 retrieves from memory and provides to the user at remote user terminal 300 a graphical representation of seating at that particular venue. In one embodiment, central controller 200 first provides a broad general outline of the entire venue (e.g., display by sections). The user can then click on a particular area to narrow his search for exact seats. With each successive selection click, the display screen at user terminal 300 narrows the scope of displayed seating until the user finds the seats he desires. The user can then select the group of seats which corresponds to the purchase offer. Central controller 200 stores the selected seats in fields 559–564 of the offer table 550. If the user prefers to select one section or multiple sections instead of specific seats, he can enter a range of selections. Central controller 200 then stores this broader selection by only using the section fields 559 and 562, and leaving the other four fields empty.

Further, the user may provide a close date to denote a date on which the offer expires. As previously discussed, central controller 200 periodically reviews this close date, and changes the status of the offer to "expired" in field 557 of the offer table 550 once the date has passed.

At step 722, central controller 200 receives the offer information transmitted by the user, and as shown in step 724, central controller 200 creates a record of the offer in offer table 550. At step 728, the user is asked if he would like to make additional offers. At this point, if the user would like to make an offer for a separate event, he may go through the same process discussed in steps 716–724. However, if the user would like to make a related, or linked offer to the offer previously provided, they may do so as follows. First, in one embodiment they provide the same event ID as at step 718. Next, after submitting the same general information previously discussed, the user indicates that this offer is linked. The central controller then assigns the offer ID number created for the initial offer as the link ID number for the related offer, and stores in the link ID field 568 of the offer table 550.

A user might provide a linked offer based on the type of seat desired. For instance, the user might select a number of the "high quality" seats in a particular venue, and offer a higher purchase price. The linked offer would include "lower quality" seats for a particular venue, perhaps at a lower purchase price. Thus, based on the link ID, potential sellers will consider both offers together during their review.

Also, the user may link offers for two separate events as opposed to the same one. For example, instead of linking offers based on seat selection and price, the user may prefer to attend one of two events in the local area, but not both. Thus, he could link these offers so that potential sellers would be made aware that the offers were conditioned against an "either/or" proposition.

The central controller 200 assigns an offer ID number to each offer in the offer ID field 551, and assigns this number as the link ID number for linked offers in link ID field 568. Also, the offer date field 554 is populated with a timestamp (e.g., date and time) indicating when the offer was posted. Next, central controller 200 assigns the value "pending" to the status field 557. This value will change to "active" upon receipt of authorization from the user's credit card issuer. Further, central controller 200 calculates the authorized amount, and stores it in authorized amount field 566. The authorized amount field represents the amount of the user's credit which is reserved to "back up" the offer and is usually equal to the total transaction amount. By reserving a portion of the user's credit, the ticket seller and ticket service can be guaranteed that they will receive payment if the offer is accepted. In case of linked offers to buy, the authorized amount is the highest transaction amount of the linked offers. When a linked offer is accepted, the system automatically considers all related offers to be withdrawn. Finally, central controller 200 stores all the information provided by the user, including the seat location based on the graphical representation of the venue, in the respective fields of the offer table 550.

At step 730, the central controller 200 extracts legal contract language from the contract detail table (not shown) and transmits to the user at user terminal 300. This language describes the legal implications of offering the guaranteed purchase offer, and the process is similar to reviewing terms before signing a written contract. If the user elects not to abide by these terms, he may cancel the offer. However, if the user does elect to abide by the terms, the user transmits a positive acknowledgment to central controller 200, and is legally bound to the terms of the guaranteed purchase offer.

In FIG. 7c, central controller 200 then contacts the user's credit card issuer at step 732 to receive authorization for the offer. First, central controller 200 collects the user name, address, credit card type, credit card number, and expiration date from customer table 530, based on the customer ID from the offer table 550. This information along with the authorization amount from field 566 of the offer table 550 is transmitted to the credit card issuer through credit card processor 230.

At step 734, the central controller 200 receives either an authorization or rejection from the credit card issuer through credit card processor 230. The credit card issuer may reject the request for any number of reasons, including an expired card, overextended credit limit, or delinquency in payments. Upon rejection, at step 736 central controller 200 notifies the user at user terminal 300 of this rejection and requests separate credit card information. Alternatively, the user may transmit information corresponding to a separate credit card, which supplements or replaces his present information in the customer table 530. If alternative credit card information is provided, step 732 is repeated in order to receive authorization for the charge. Upon receiving authorization from the credit card issuer through the credit card processor 230, central controller 200 updates offer table 520, including changing status field 557 to "active" to confirm the posted offer.

FIGS. 7d–7g illustrate the processing steps executed based on the user's choice at step 714 to review offers from potential buyers. At step 740, central controller 200 transmits general venue and event information to user terminal 300 for display to the user. As discussed earlier at step 716, central controller 200 may provide a number of options to the user to identify the exact event the user wishes to review. Ultimately, central controller 200 provides the user with the event ID from field 502 of the event table 500. At step 742, the user supplies the event ID to central controller 200 so it may identify associated offers in offer table 550.

At step 744, central controller 200 identifies offer records associated with the selected event ID and having an "active" status. Central controller 200 transmits this data to user terminal 300 for display to the user. The user may review all offers for the specific event together, or one at a time. In one embodiment, the user may review each individual offer through a graphic display of the venue, to pinpoint exactly where the buyer is requesting seats. In some cases, the offer may be for seats anywhere in the entire arena. In others, the offer may only be for a specific range of sections, rows or seats. In one embodiment, the user may be able to enter their exact ticket information to confirm whether it meets the requirements of the offer.

As previously discussed, linked offers will be appropriately identified upon presentation to the user. In this case, central controller 200 allows associated linked offers to be reviewed simultaneously, so that the user can compare the conditional offers submitted from a single buyer.

Next, at step 746, central controller 200 receives either a request to accept a particular offer, or a request to review offers for other events. In the latter case, steps 740, 742 and 746 will be repeated. It should be noted that the user may exit the system at any time prior to accepting an offer.

After the user transmits a request to accept a particular offer, at step 748 the user transmits the original ticket number and seat location (i.e. section, row and seat) to central controller 200. Upon receiving this information from the user, central controller 200 at step 750 transmits the original ticket number and seat location to the venue controller 400 for verification of the ticket's validity.

Figure 7E:
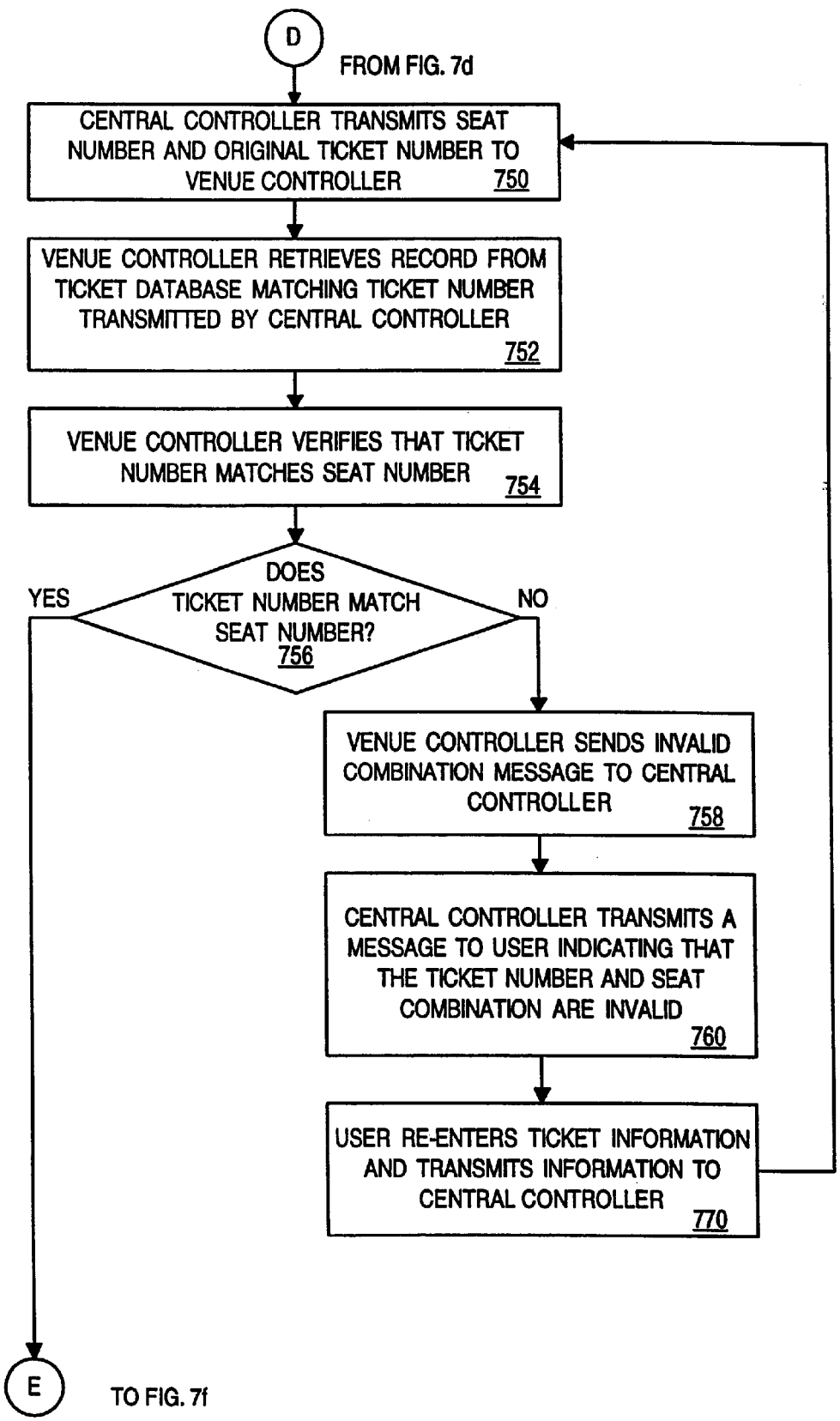

Referring now to FIG. 7e, at step 752 venue controller 400 retrieves a record from ticket table 610 matching the ticket number transmitted by central controller 200 in step 750. Venue controller 400 verifies that the transmitted ticket number matches the transmitted seat location at steps 754 and 756. If the transmitted ticket and seat location do not match, at step 758, venue controller 400 transmits an invalid combination message to central controller 200. Central controller 200 then transmits a message to user terminal 300 indicating that the ticket number and seat location are an invalid combination at step 760. Upon receiving the invalid combination message at user terminal 300, the user can resubmit the ticket and seat location to central controller 200 at step 770. The process then loops back to step 750. If the ticket number and seat location combination is valid, the process continues with step 772.

Figure 7F:
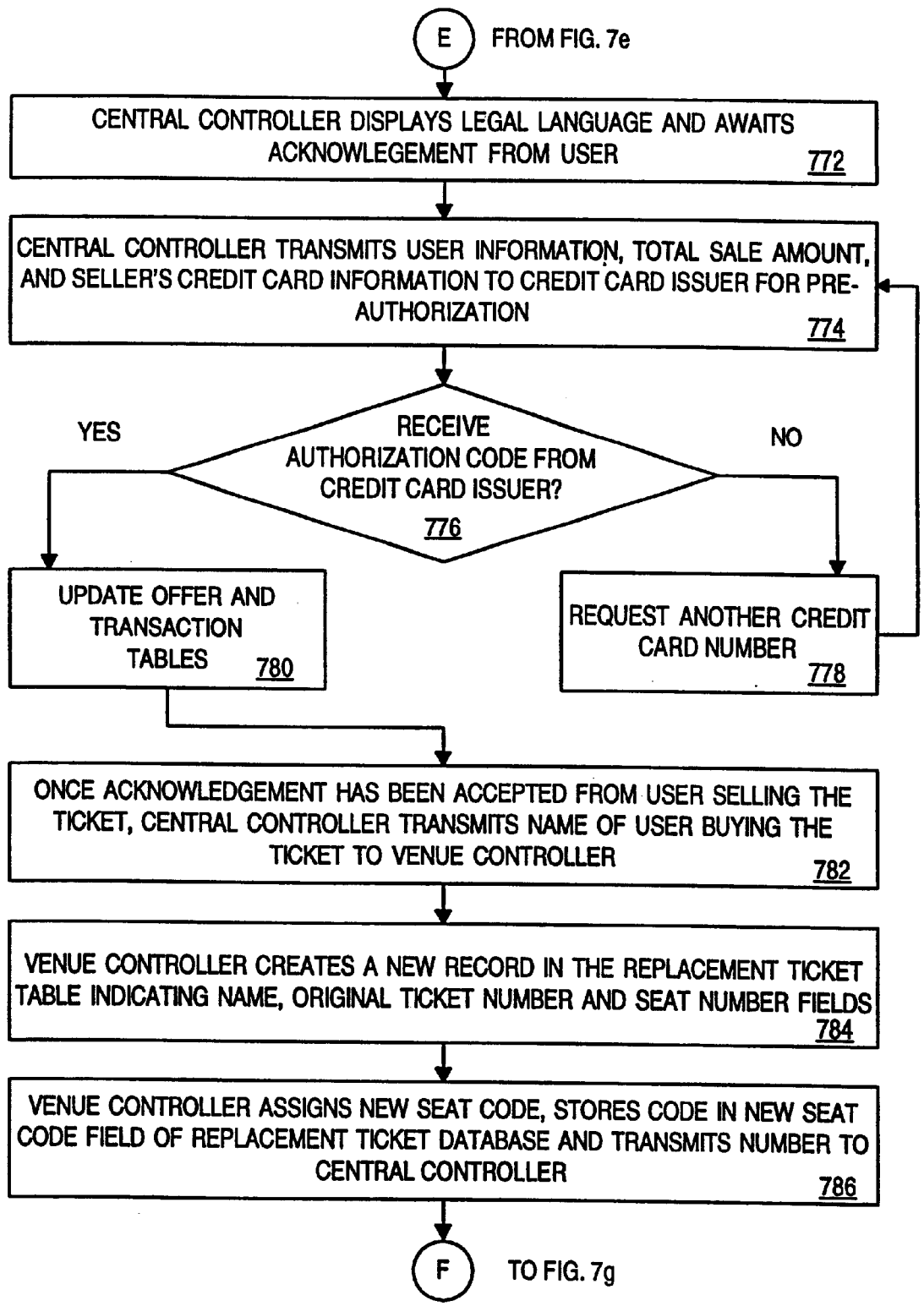
Figure 7G:
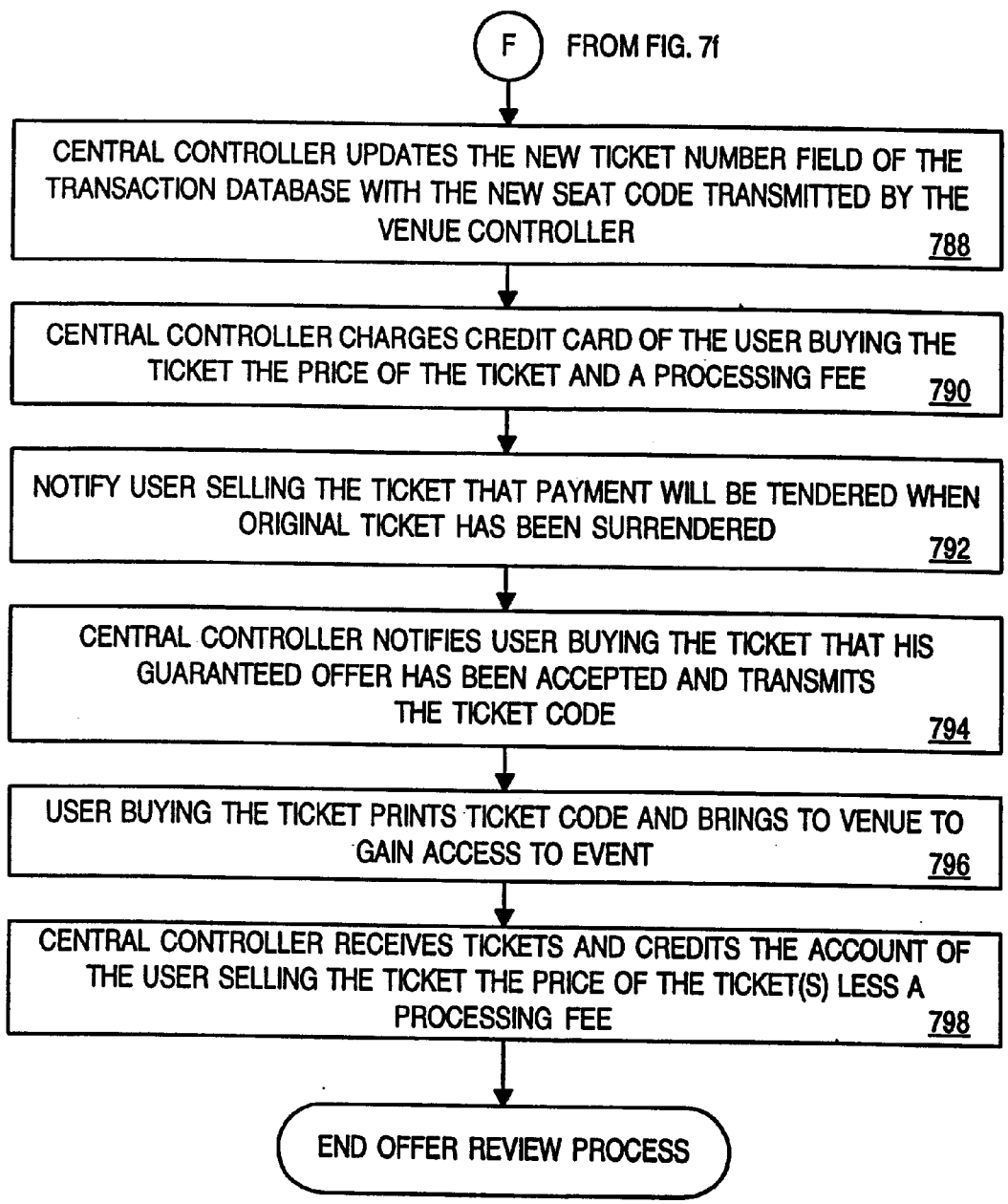

At step 772 of FIG. 7f, central controller 200 transmits to user terminal 300 legal contract language which is displayed to the user selling his ticket. As previously indicated, this contract language may be stored in a contract detail table (not shown). This language describes the legal implications of accepting the guaranteed purchase offer, and the process is similar to reviewing terms before signing a written contract. If the user selling his ticket elects not to abide by these terms, the user may cancel his acceptance. However, if the user elects to abide by the terms, the user transmits a positive acknowledgment to central controller 200, and is legally bound to the acceptance.

Central controller 200 then contacts the user's credit card issuer at step 776 to receive authorization for the acceptance. Central controller 200 requests authorization from the credit card issuer to reserve a portion of the user's credit based on the offer information and credit information collected from the user at step 706 and stored in customer table 530. This credit reservation is a fraud deterrent and may be used as a penalty in the event the seller fails to deliver the tickets. Such a penalty creates buyer confidence and provides assurance to a user buying the ticket that the user selling the ticket will, in fact, relinquish the tickets. The penalty could be paid to the user buying the ticket if the user selling the ticket attempts to repudiate the agreement. This penalty may be determined in a number of ways including imposing a flat penalty on the user selling the ticket or imposing a penalty equal to the entire amount offered by the user buying the ticket.

At step 774, central controller 200 collects information from the user selling the ticket. The information may include the user name, address, credit card number and expiration date from customer table 530, based on the customer ID retrieved from the offer table 550. This information, along with the authorization amount from field 566 of the offer table 550, is transmitted to the credit card issuer through credit card processor 230.

At step 776, central controller 200 receives either an authorization or rejection from the credit card issuer through credit card processor 230. The credit card issuer may reject the request for any number of reasons, including an expired card, overextended credit limit, or delinquency in payments. Upon rejection, at step 728 central controller 200 notifies the user at user terminal 300 of the rejection and requests alternate credit card information. The user may attempt to transmit the same credit information as provided earlier, because the user may have mistakenly transmitted incorrect information earlier. Alternatively, the user may transmit information corresponding to an alternate credit card, which will supplement or replace the credit card information in customer table 530. Further, the user could cancel the transaction altogether. If alternative credit card information is provided, step 774 is repeated in order to receive authorization for the charge.

If central controller 200 receives authorization from the credit card issuer through credit card processor 230, the process continues with step 780 wherein central controller 200 generates and assigns a transaction ID to the sale. This transaction ID is stored in field 567 of the offer table 550. Further, central controller 200 creates a new record in transaction table 580, indexed by the assigned transaction ID. The assigned transaction ID is also stored in field 581 of transaction table 580. The original ticket number 590 field of transaction table 580 is populated with the appropriate ticket number(s) from the user selling the ticket. Further, central controller 200 timestamps the acceptance using date field 583 indicating when the acceptance was posted.

Once the guaranteed purchase offer has been accepted, central controller 200 uses the customer ID from field 552 as an index into customer table 530 to retrieve the name of the user buying the ticket. At step 782, central controller 200 transmits the name of user buying the ticket to the venue controller 400.

At step 784, venue controller 400 creates a new record in replacement ticket table 630. The new record is populated with information indicating the buyer's name, the original ticket number, the section, row and seat of the ticket. As shown at step 786, the new record is further populated with a replacement ticket number assigned by venue controller 400. The replacement ticket number is then transmitted to central controller 200

Once central controller 200 has received the replacement ticket number 642 from venue controller 400, central controller 200 then updates the new ticket number field 594 of transaction table 580 at step 788. At step 790, central controller 200 determines the payment due and charges the credit card, of the user buying the ticket, the price of the ticket plus a processing fee 587. Central controller 200 also updates field 585 of the transaction table 580 with the amount charged. Finally, central controller 200 updates field 589 with the seller ID of the user accepting the offer, and central controller 200 updates field 586 with the seller amount authorized in the event that the seller tries to use his sold ticket. Field 584 is updated based on buyer amount charged 585 less the processing fee 587. Although fees of the present embodiment are illustrated as being stored in a table, such fees could easily be calculated instead of being retrieved from a table.

At step 792, central controller 200 transmits a message to user terminal 300 to notify the user selling the ticket that it will credit his credit card account with the sale amount of the ticket as soon as central controller 200 receives verification that the original tickets have been surrendered.

At step 794 the central controller transmits replacement ticket number 692 and a message to the user buying the ticket indicating that his guaranteed offer has been accepted. The user buying the ticket may then print the replacement ticket number, take it to the venue and use it to gain access to the desired event, at step 796. The cancellation of the original number and issuance of a replacement ticket number tied to the purchasing user's name is done in order to prevent fraud by either the ticket seller and/or the purchaser.

For instance, if a seller arrives at a venue with a ticket, and a purchaser also arrives to the same venue with a replacement ticket for the same seat, the venue controller can be accessed to determine which ticket is valid. The replacement ticket always supersedes the original ticket, provided it is registered in the replacement ticket table 630 of the venue controller 400. If such fraud is attempted by the seller and detected by central controller 200, the central controller can charge the seller's credit card account the seller amount authorized in field 856 of transaction table 580.

As another example, if two people arrive at the venue with the same replacement ticket, the venue controller can be accessed to determine the rightful owner, based on the contents of the new buyer name field 640, of replacement ticket table 630. These measures taken against fraud will assure customers that there will be no problems in using central controller 200 to buy and sell tickets.

Finally, at step 798, central controller 200 receives verification that the original ticket has been received from the seller, and credits the credit card account of the user selling the ticket with the transaction amount 584. Central controller further updates the date tickets received field 588 accordingly. Surrender of the ticket is preferably accomplished by delivery of the ticket to a will call window of the venue, however other surrender arrangements are possible, such as through the postal service or Federal Express. Once the ticket has been surrendered and the transaction is complete, central controller 200 updates status field 557 of the offer table 550 to "completed" for tracking purposes. Upon receipt of the surrendered tickets, central controller 200 credits the account of the user selling the tickets.

Although the preferred method of surrendering the original tickets is using the mail or other delivery mechanism, numerous alternate embodiments are possible. Using one alternate embodiment, ticket redemption could be constructively accomplished at the time an offer to buy is irrevocably accepted. The alternate embodiment employs event tickets that can be physically altered to render them invalid or void. Each ticket includes a unique ticket number that is preprinted on the face of the ticket, but obscured from view by a scratch-off covering, such as an opaque latex coating. The ticket number is unknown to the ticket holder unless the scratch-off covering is removed.

At the time of acceptance, the seller possessing the tickets is instructed to remove the covering over the ticket number on each ticket to be sold. The ticket number is provided to central controller 200 to verify that the ticket seller is, in fact, in possession of valid tickets. The ticket number provided for each ticket involved in the transaction is then electronically voided and replacement ticket number is assigned as previously described.

The act of revealing the ticket number not only serves to verify the ticket seller's possession of the tickets, but also eliminates the need for the seller to surrender the tickets because removal of the scratch-off covering voids the tickets. While this alternate embodiment requires additional structure with respect to the event tickets, it eliminates the need to reserve a portion of the seller's credit line as a penalty for failing to return the unused tickets.

Illustrative Example

An illustrative example of the invention will now be described using the data populating various fields of the figures. Record 572 of the offer table 550 is a guaranteed offer to buy as indicated by type field 556 that has been submitted by user 4000 as identified by customer ID field 552. User 4000, as denoted by record 548 in the customer table 530 is Sue Black, residing at 101 Pink Ave in Norwalk, CT. The credit card number submitted to central controller 200 is Discover card number 4444-4444-4444-4444 that expires August 2002 and was issued to Susan Black.

In record 572 of the offer table 550, Sue Black has posted a guaranteed offer to buy two tickets to event ID E001, as denoted by event ID field 553, for $200.00 per ticket in the first row of the first section of the venue. As denoted by record 514 of event table 500, event E001 is an NHL game, specifically NJ Devils vs. New York Rangers, occurring on 5/6/97 at 7:30 PM at "MSG" as denoted by venue ID field 508. Record 526 of venue table 520 identifies MSG as the Madison Square Garden venue in New York, N.Y.

In addition to this guaranteed purchase offer, Sue Black has also posted a link offer as denoted by linked ID field 568. This linked offer has an ID code of 0333. Record 570 of offer table 550 has the offer ID 0333, and is therefore the offer that is linked to record 572. Record 570 is an offer by Sue Black to purchase four tickets to the NHL game NJ Devils vs. New York Rangers having the same date and time as the offer request of record 572. In record 570, Sue Black indicates that she will pay $250 each for four tickets in the first row of the first section of the venue. Because offer 570 is linked to offer 572, Sue Black has indicated that she would like one or the other of the two offers.

Field 566 of offer table 550 indicates that $1,000 has been authorized by Discover for account 4444-4444-4444-4444 for both records 570 and 572, submitted by Sue Black. $1,000 is the maximum possible amount that Sue Black's offers could cost her if one of them is fulfilled.

For record 572, the transaction ID field 567 has been populated with a transaction ID, indicating that a buyer has accepted Sue Black's guaranteed offer to buy. Status field 557 of record 572 registers that the offer has been fulfilled, and the status record 570 is expired, since it was linked to record 572 in a way indicating that if one was filled, the other should be disregarded.

Record 595 of transaction table 580 describes the detail of transaction TR001, which is the acceptance of Sue Black's guaranteed offer to buy by seller 2000, as indicated by seller ID field 589.

Record 570 of the customer table 530 indicates that customer having the ID number 2000, as indicated by customer ID field 532, is Jill Janson, residing in 456 Red Drive, Atlanta GA, and having Master Card number 2222-2222-2222-2222 with expiration date 9/99 registered with central controller 200.

Record 595 indicates that Sue Black was charged $420 on 5/2/97 for her purchase of seats 003 and 004 of row 1, seat 1 of the event tied to the record of her guaranteed purchase offer in offer table 550. Record 595 also indicates that Jill Janson has sold her original ticket numbers 667913 and 667914, stored in the original ticket number field 810, for section 001, row 001, and seat 003 and 004. The seller amount authorized field 585 stores $400, the amount that central controller 200 has been authorized by Mastercard to debit from account 2222-2222-2222-2222 in the event that Jill Janson does not honor her agreement to sell her tickets. All or a portion of this amount can be credited to Sue Black if there is a problem using her new ticket number for access to the venue event.

The date tickets received field 588 is blank for this record, indicating that central controller 200 has not yet received verification that Jill Janson has surrendered her tickets. Once central controller 200 has received verification that Jill Janson has surrendered her tickets, Jill Janson's credit card account will be credited $380, the amount stored in transaction amount field 584.

Central controller 200 has issued replacement ticket numbers to Sue Black for both seats. These replacement ticket numbers are stored in field 594. Preferably, Sue Black will print out these replacement ticket numbers and take them with her to the venue to gain access to the event.

Records 622 and 624 of ticket table 610 store information relating to the original tickets issued to Jill Janson. Records 644 and 646 of replacement ticket table 630 store the replacement ticket numbers issued by central controller 200 to Sue Black, which replace the original ticket numbers given to Jill Janson. These records are stored by venue controller 400 to be used in the event of fraud as previously described.

It is important to note that in the embodiment described above, the notification of the parties, both buyer and seller is performed through contacting their respective remote user terminals. This notification can also be performed using conventional technology including but not limited to telephone, facsimile, e-mail and paging.

In addition to the guaranteed offer and acceptance system of the present invention, the present embodiment is also well suited for other aspects of ticket resale. For example, the present embodiment can include a registration process for certain events or tickets. Such a process would enable a prospective ticket buyer to set up a ticket watch which could be implemented by central controller 200. Central controller 200 could periodically poll offers to determine if specific tickets are available. Availability could be transmitted to a user via conventional telephone lines, E-mail, facsimile or pager. A notification preference could be determined by the user during the registration process.

Another aspect of ticket resale that is well suited to the present embodiment is advertising. Instead of simply allowing users to place, review and accept offers, the system could provide advertising for products related to events and tickets.

Of course, these and many other features and advantages of the present invention are apparent from the detailed specification. Thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method for electronically completing a transaction between a remote prospective event ticket buyer and a remote potential event ticket seller, comprising:
    electronically receiving from said buyer a purchase offer for an event ticket containing at least one condition, an account number from a general purpose financial account, and authorization to charge said general purpose financial account for a purchase meeting said at least one condition;
    electronically making available said purchase offer to a plurality of remote potential event ticket sellers;
    electronically receiving from at least one of said remote potential event ticket sellers an unconditional acceptance of said purchase offer;
    electronically transmitting a replacement ticket number associated with said event ticket to said buyer; and
    electronically receiving a second general purpose financial account number from said seller and authorization to charge an account identified by said second general purpose account number; and processing a charge applied to said account.

2. A method for electronically completing a transaction between a remote prospective event ticket buyer and a remote potential event ticket seller, comprising:
    electronically receiving from said buyer a purchase offer for an event ticket containing at least one condition, an account number from a general purpose financial account, and authorization to charge said general purpose financial account for a purchase meeting said at least one condition;
    electronically making available said purchase offer to a plurality of remote potential event ticket sellers;
    electronically receiving from at least one of said remote potential event ticket sellers an unconditional acceptance of said purchase offer;
    electronically receiving a signal representing a ticket number associated with said event ticket and processing a payment to said seller; and
    electronically transmitting a replacement ticket number associated with said event ticket to said buyer.

3. A method for electronically completing a transaction between a remote prospective event ticket buyer and a remote potential event ticket seller, comprising:
    electronically receiving from said buyer a purchase offer for an event ticket containing at least one condition, an account number from a general purpose financial account, and authorization to charge said general purpose financial account for a purchase meeting said at least one condition;
    electronically making available said purchase offer to a plurality of remote potential event ticket sellers;
    electronically receiving from at least one of said remote potential event ticket sellers an unconditional acceptance of said purchase offer;
    electronically transmitting a replacement ticket number associated with said event ticket to said buyer; and
    electronically storing data representing a cancellation of said event ticket.

4. A method for electronically completing a transaction between a remote prospective event ticket buyer and a remote potential event ticket seller, comprising:
    electronically receiving from said buyer a purchase offer for an event ticket containing at least one condition, an account number from a general purpose financial account, and authorization to charge said general purpose financial account for a purchase meeting said at least one condition;
    receiving name data representing an identity of said buyer;
    storing said name data to associate said identity of said buyer with said event ticket;
    electronically making available said purchase offer to a plurality of remote potential event ticket sellers;
    electronically receiving from at least one of said remote potential event ticket sellers an unconditional acceptance of said purchase offer; and
    electronically transmitting a replacement ticket number associated with said event ticket to said buyer.

5. A method for electronically completing a transaction between a remote prospective event ticket buyer and a remote potential event ticket seller, comprising:
    electronically receiving from said buyer a purchase offer for an event ticket containing at least one condition, an account number from a general purpose financial account, and authorization to charge said general purpose financial account for a purchase meeting said at least one condition;
    electronically making available said purchase offer to a plurality of remote potential event ticket sellers;
    electronically receiving from at least one of said remote potential event ticket sellers an unconditional acceptance of said purchase offer;
    electronically transmitting a replacement ticket number associated with said event ticket to said buyer; and
    transmitting to a venue controller a ticket identifier associated with said event ticket.

6. The method of claim 5, wherein the step of determining said replacement ticket identifier includes the step of receiving said replacement ticket identifier from said venue controller.

7. A method for electronically completing a transaction between a remote prospective event ticket buyer and a remote potential event ticket seller, comprising:
    electronically receiving from said buyer a purchase offer for an event ticket containing at least one condition, an account number from a general purpose financial account, and authorization to charge said general purpose financial account for a purchase meeting said at least one condition;

electronically making available said purchase offer to a plurality of remote potential event ticket sellers;

electronically receiving from at least one of said remote potential event ticket sellers an unconditional acceptance of said purchase offer; and electronically transmitting a replacement ticket number associated with said event ticket to said buyer, wherein said replacement ticket number includes an original ticket identifier.

8. A computer-readable storage medium encoded with processing instructions for implementing a method for electronically completing a transaction between a remote prospective event ticket buyer and a remote potential event ticket seller, said processing instructions for directing a computer to perform the steps of:

electronically receiving from said buyer a purchase offer for an event ticket containing at least on condition, an account number from a general purpose financial account, and authorization to charge said general purpose financial account for a purchase meeting said at least one condition;

electronically making available said purchase offer to a plurality of remote potential event ticket sellers;

electronically receiving from at least one of said remote potential event ticket sellers an unconditional acceptance of said purchase offer;

electronically transmitting a replacement ticket number associated with said event ticket to said buyer;

electronically receiving a second general purpose financial account number from said seller and authorization to charge an account identified by said second general purpose account number; and processing a charge applied to said account.

9. A computer-readable storage medium encoded with processing instructions for implementing a method for electronically completing a transaction between a remote prospective event ticket buyer and a remote potential event ticket seller, said processing instructions for directing a computer to perform the steps of:

electronically receiving from said buyer a purchase offer for an event ticket containing at least on condition, an account number from a general purpose financial account, and authorization to charge said general purpose financial account for a purchase meeting said at least one condition;

receiving name data representing an identity of said buyer; storing said name data to associate said identity of said buyer with said event ticket;

electronically making available said purchase offer to a plurality of remote potential event ticket sellers;

electronically receiving from at least one of said remote potential event ticket sellers an unconditional acceptance of said purchase offer; and electronically transmitting a replacement ticket number associated with said event ticket to said buyer.

10. A computer-readable storage medium encoded with processing instructions for implementing a method for electronically completing a transaction between a remote prospective event ticket buyer and a remote potential event ticket seller, said processing instructions for directing a computer to perform the steps of:

electronically receiving from said buyer a purchase offer for an event ticket containing at least on condition, an account number from a general purpose financial account, and authorization to charge said general purpose financial account for a purchase meeting said at least one condition;

electronically making available said purchase offer to a plurality of remote potential event ticket sellers;

electronically receiving from at least one of said remote potential event ticket sellers an unconditional acceptance of said purchase offer; and electronically transmitting a replacement ticket number associated with said event ticket to said buyer; and transmitting to a venue controller a ticket identifier associated with said event ticket.

11. The article of manufacture of claim 10 wherein the step of determining said replacement ticket identifier includes the step of receiving said replacement ticket identifier from said venue controller.

12. A computer-readable storage medium encoded with processing instructions for implementing a method for electronically completing a transaction between a remote prospective event ticket buyer and a remote potential event ticket seller, said processing instructions for directing a computer to perform the steps of:

electronically receiving from said buyer a purchase offer for an event ticket containing at least on condition, an account number from a general purpose financial account, and authorization to charge said general purpose financial account for a purchase meeting said at least one condition;

electronically making available said purchase offer to a plurality of remote potential event ticket sellers;

electronically receiving from at least one of said remote potential event ticket sellers an unconditional acceptance of said purchase offer; and electronically transmitting a replacement ticket number associated with said event ticket to said buyer, wherein said replacement ticket number includes an original ticket identifier.

* * * * *

UNITED STATES PATENT AND TRADEMARK OFFICE
CERTIFICATE OF CORRECTION

PATENT NO.    : 6,240,396 B1
DATED         : May 29, 2001
INVENTOR(S)   : Jay S. Walker et al.

It is certified that error appears in the above-identified patent and that said Letters Patent is hereby corrected as shown below:

<u>Title page,</u>
Item [56], References Cited, OTHER PUBLICATIONS, please add
-- Koepper, Ken, Room Inventory Auctioning: The Next CRS Generation, Lodging, January 1990, pp 26, 29-30 --

Signed and Sealed this

Second Day of September, 2003

JAMES E. ROGAN
*Director of the United States Patent and Trademark Office*